(12) United States Patent
Kirkpatrick et al.

(10) Patent No.: US 6,183,087 B1
(45) Date of Patent: Feb. 6, 2001

(54) GENEVA MECHANISM AND MOTION PICTURE PROJECTOR USING SAME

(75) Inventors: David H. Kirkpatrick; Andrew F. Kurtz, both of Rochester, NY (US)

(73) Assignee: Eastman Kodak Company, Rochester, NY (US)

( * ) Notice: Under 35 U.S.C. 154(b), the term of this patent shall be extended for 0 days.

(21) Appl. No.: 09/329,841

(22) Filed: Jun. 11, 1999

(51) Int. Cl.$^7$ .............................. G03B 1/24; F16H 55/17; B23B 29/24
(52) U.S. Cl. ............................. 352/189; 74/436; 74/820
(58) Field of Search ..................... 352/166, 187, 352/188, 189, 190; 74/434, 436, 820; 251/249; 413/44; 414/905

(56) References Cited

U.S. PATENT DOCUMENTS

| | | | |
|---|---|---|---|
| 449,334 | * 3/1891 | Roraback | 74/436 |
| 688,086 | 2/1901 | Brown, Jr. | 29/35.5 |
| 1,198,683 | * 3/1916 | Victor | 74/436 |
| 1,561,060 | 11/1925 | De Vault | 226/84 |
| 1,774,789 | 9/1930 | Dina | 74/436 |
| 1,801,969 | 4/1931 | Moulton | 352/189 |
| 1,803,465 | 5/1931 | Dina | 74/436 |
| 2,186,123 | 1/1940 | Rantsch et al. | 353/38 |
| 2,512,894 | * 6/1950 | Gieskieng | 74/436 |
| 2,789,441 | 4/1957 | Thorburn | 74/436 |
| 3,286,536 | 11/1966 | Hallmann | 74/84 R |
| 3,443,455 | * 5/1969 | Zugel | 74/820 |
| 3,855,873 | 12/1974 | Fletcher et al. | 74/436 |
| 4,377,953 | * 3/1983 | Hagen | 74/436 |
| 4,497,015 | 1/1985 | Konno et al. | 362/268 |
| 4,665,764 | 5/1987 | Inoue et al. | 74/436 |
| 4,724,760 | * 2/1988 | Bubley | 101/115 |
| 4,863,262 | 9/1989 | Berggren et al. | 352/187 |
| 5,165,295 | * 11/1992 | Dohnal et al. | 74/436 |
| 5,197,354 | * 3/1993 | Mohr et al. | 74/820 |

OTHER PUBLICATIONS

LaVezzi Precision, Inc., "Cinema Projector Components", Copyright 1987.
Ewald Boecking and L. W. Davee, "Recent Developments in Projection Mechanism Design", Mar., 19942 pp. 262–280.
LaVezzi Machine Works, Inc., Catalog L70–3, "Motion Picture Projector Components", Copyright 1979.

* cited by examiner

Primary Examiner—David M. Gray
Assistant Examiner—Rodney Fuller
(74) Attorney, Agent, or Firm—David A. Novais; Nelson Adrian Blish

(57) ABSTRACT

A driving mechanism such as a Geneva Mechanism which allows a load, such as film in a motion picture projector, to be intermittently advanced with controlled acceleration. The Geneva Mechanism includes a star wheel and a rotating driver. The star wheel includes slots and is operationally associated with the load. The rotating driver includes a drive pin which cooperates with the slots to cause an intermittent rotation of the star wheel. Either the slots or the drive pin is shaped in a controlled manner to permit optimum acceleration and deceleration of the star wheel.

22 Claims, 27 Drawing Sheets

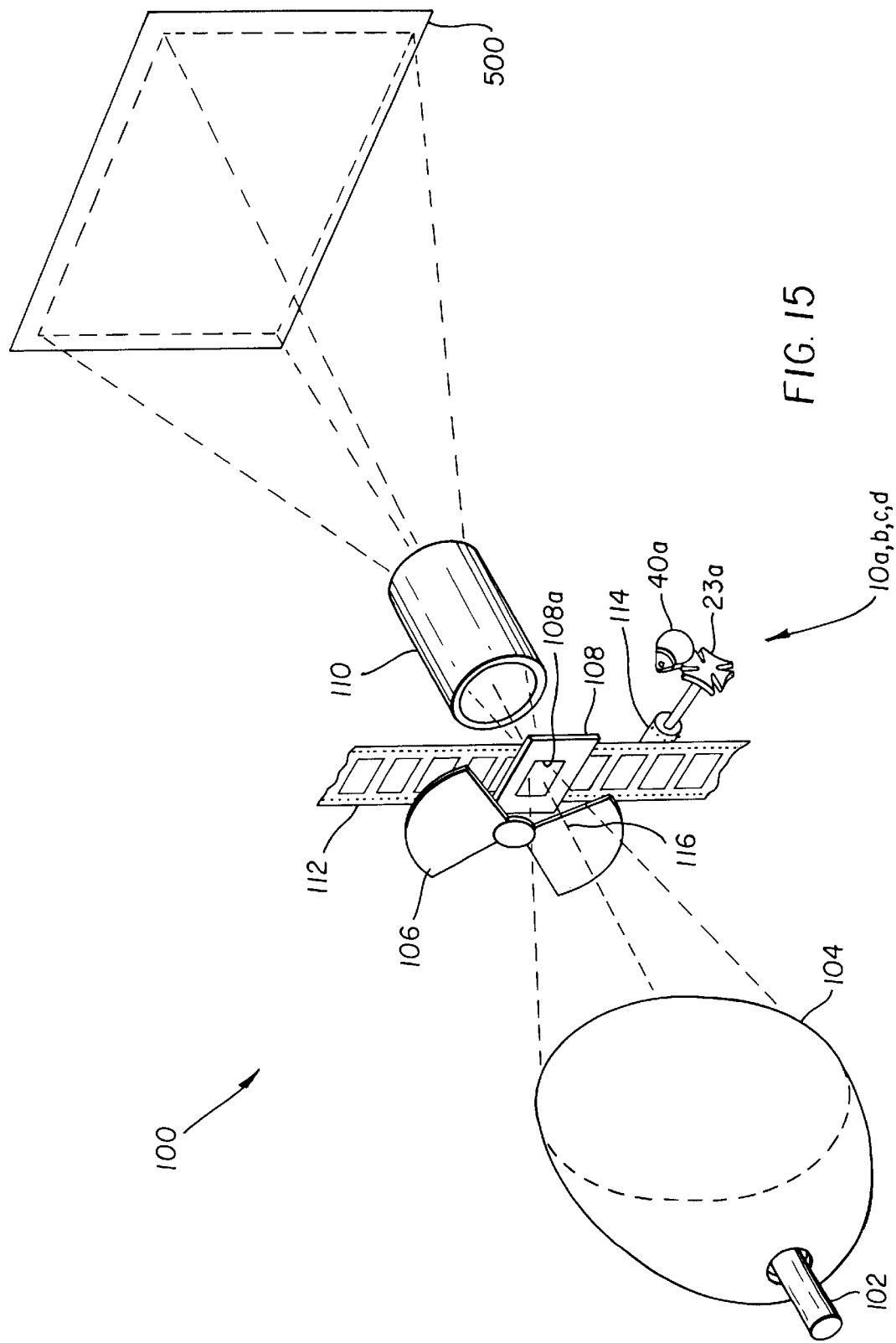

GENEVA MECHANISM AND MOTION PICTURE PROJECTOR USING SAME

FIELD OF THE INVENTION

The present invention relates to a drive mechanism such as a Geneva Mechanism, and a motion picture projector using the same. More particularly, the present invention relates to an improved Geneva Mechanism, which includes a star wheel and driver particularly suited for intermittently advancing a load, such as film, with controlled acceleration, which can be used in a motion picture projector.

BACKGROUND OF THE INVENTION

Geneva Mechanisms are widely used in motion picture film projectors to intermittently advance film through a film gate having a projection aperture. The film is moved or advanced by a Geneva Mechanism (also known as a "Maltese Cross") until an image frame is in alignment with the projection aperture. The film is then held stationary for a discrete time period during which light is passed through the aperture, film frame, projection lens, and onto a screen. This intermittent frame-by-frame motion of the film is enabled by the Geneva Mechanism, which comprises one portion, the driver, which rotates continuously, and which causes intermittent rotation of a second portion, the star wheel. In a motion picture projector the star wheel shares its central shaft with a sprocket, the teeth of which are engaged with perforations in the film. Therefore, when the driver moves the star wheel, both the star wheel and the film experience a resulting intermittent motion. Other mechanisms, including servo motors and a Mitchell Movement, have been used to drive film through a gate in an intermittent manner, but the Geneva Mechanism has proven itself over the past century to be particularly well suited to accurately drive a load (the film) in an intermittent fashion when the time allowed for motion of the load is minimal. For example, motion picture film is typically projected at a rate of 24 frames per second, such that a new film frame is positioned in the projection aperture every $\frac{1}{24}$ second, or approximately 42 ms. The typical projector Geneva Mechanism moves a film frame into the projection aperture with an indexing time of one-fourth of the frame period, or approximately 10.5 ms.

During essentially all of this indexing time, a shutter must block the light incident to the film to prevent the appearance of "travel ghost" (smear of the image caused by film motion). The projectable frame time, which would appear to be approximately three-fourths of the total frame period, is further reduced to only approximately one-half of the total frame period because the typical motion picture projector employs a two-bladed shutter, which causes two blanking periods per frame of the film, in order to raise the apparent frame rate to 48 frames per second, and thereby greatly reduce the apparent flicker perceived by the human eye. Furthermore, it is necessary for these two shutter intervals to be nearly equal in duration in order to limit perceived flicker. Therefore, since one blanking period must be approximately one-fourth of the frame period in order to blank the projected image as the film moves, the other blanking period must be of essentially the same duration.

A basic Geneva Mechanism, as is commonly employed in motion picture projectors, is described in U.S. Pat. No. 1,774,789. In general, a Geneva Mechanism is used to convert uniform rotary motion to incremental rotary motion. Typically, such a mechanism includes a star wheel having a plurality of radially extending straight slots spaced equally around the periphery of the star. Interposed between these slots are concave cam guide surfaces, which, like the slots, are uniformly dimensioned and arranged. A driver component, comprised of a restraining cam, a drive arm extending from the base of the cam, and a drive pin near the far end of the drive arm, is employed for indexing the star wheel. The restraining cam has a side cam surface, which is convex and configured to interact with the concave cam guide surfaces of the star wheel. The close contact of this convex cam surface to the concave cam guide surfaces restrains the star wheel from experiencing rotary motion except during the periods in which the star wheel is driven by the drive pin. The star wheel is thus restrained intermittently, and in a manner such that the straight slots sequentially receive the drive pin.

The number of slots radially disposed around a Geneva Mechanism's star wheel is variable, and may be any whole number greater than 2. As the number of straight slots is changed, specific features of the mechanism such as component sizes, the speed and duration of the intermittent motion, and the forces or loads applied to the drive pin and star wheel, and to the load (film) all vary as well. For example, the Geneva Mechanisms used in motion picture projectors (which vary some in detail depending on the projector) typically use a star wheel with four equally spaced straight-sided slots. Such star wheels with four straight slots are engaged with the driver pin for 90° of a 360° revolution of the driver, producing the intermittent motion. Thus, in the case of film projected at 24 frames per second, the star wheel and film experience movement during an indexing time of only approximately 10.5 ms of the approximately 42 ms available time per frame. By comparison, a star wheel with three straight slots will also experience intermittent motion once per revolution of the cam, but the engagement of the star wheel with the driver pin occurs over only 60° of the 360° revolution of the driver. If used in a motion picture projector at 24 frames per second, a star wheel with three slots would utilize an indexing time of approximately 7 ms per frame to move a film frame into the projecting aperture. While a three slot star wheel would thus decrease the time required to move the film and thereby increase the available projection time, the acceleration forces applied to the drive pin, slots, and the load (the film and film perforations) are greatly increased over those of a four-slot mechanism, making the three-slot mechanism undesirable for use in a projector. On the other hand, a star wheel with five straight slots will have any one slot engaged with the driver pin over 118° of the 360° revolution of the driver, for an indexing time of approximately 14 ms versus the approximately 42 ms available time per frame. This is not desirable in a projector, as the light efficiency to the screen would be significantly reduced when compared with those of a four-slot mechanism, and a more powerful lamp would be needed to obtain the same screen luminance. However, the acceleration forces on the drive pin, star wheel, and load (film perforations) would be reduced relative to a three or four straight slot star wheel.

Accordingly, it would be very advantageous to find a geometry for a Geneva Mechanism in which the indexing time is reduced, and therefore the projectable time available per frame is increased, without necessarily incurring a substantial increase in the acceleration forces applied to the drive pin, star wheel slots, and the load (the film and film perforations). U.S. Pat. No. 1,801,969 proposes to solve this problem by altering the slots of the star wheel to have curved surfaces. Thus, as the drive pin moves in engagement with these curved slots, the acceleration and velocity experienced by both the star wheel and the load (film) are altered, and the indexing time is greatly reduced when compared with that of a star wheel with an identical number of straight slots operating at the same frame rate. However, the designs for the curved star wheel slots described in U.S. Pat. No. 1,801,969 fail to adequately provide for the forces applied both to the drive pin and to the star wheel slot surfaces with which the pin is in contact. As a result, a drive pin and/or slot surfaces manufactured per U.S. Pat. No. 1,801,969 would quickly experience overloading failure during operation. Furthermore, the curved star wheel slot geometry as described in U.S. Pat. No. 1,801,969 also fails to provide sufficient slot width at the mouth of the slot for the drive pin to enter and exit the slot without very heavy interference.

It should therefore readily be appreciated that there currently exists a need for an improved Geneva Mechanism, which includes a driver with a cam and a star wheel; in which a load can be advanced intermittently with a reduced indexing time required to experience the intermittent motion, while the load forces applied to the star wheel, drive pin, and the load are all controlled, without sacrificing any of the advantages normally attendant to the use of a Geneva Mechanism. It should also be apparent, that other improved configurations for Geneva Mechanisms, in which the indexing time required to experience the intermittent motion can be reduced while the forces on the load driven by the star wheel and on the drive pin are also reduced, would likewise be advantageous. Likewise, it should be apparent that yet other improved configurations for Geneva Mechanisms, in which the indexing time is effectively unchanged, but where the load forces applied to the star wheel, drive pin, and load are substantially reduced, would also have value. Finally, it should be readily apparent that such improved Geneva Mechanisms could be employed in devices generally, and in motion picture projectors particularly, with an advantageous affect.

SUMMARY OF THE INVENTION

It is, therefore, an object of the present invention to provide for a drive mechanism such as a Geneva Mechanism for intermittently moving a load, such as film, in a motion picture projector; where the time for intermittent motion is reduced, the load on the mechanism is reduced, the load on the object being moved is reduced, or some combination thereof.

The present invention relates to a Geneva Mechanism for intermittently driving a load. The mechanism comprises: a rotating driver having a drive pin; and a star wheel operationally associated with a load which is to be intermittently driven, with the star wheel comprising a plurality of radially extending slots, and each of the radially extending slots being curved along a substantial portion of its length. The drive pin of the rotating driver is engageable with one of the radial extending slots to drive the star wheel in an incremental angular manner, such that a drive pin load on the drive pin and forces applied to the load operationally associated with the star wheel remain in control, and the star wheel reaches a peak acceleration and deceleration in a continuous and controlled manner.

The present invention further relates to a Geneva Mechanism for intermittently driving a load which comprises: a rotating driver having a shaped drive pin; and a star wheel operationally associated with a load which is to be intermittently driven, with the star wheel comprising a plurality of radially extending slots which are located periodically around a circumference of the star wheel. The shaped drive pin has a controlled shaped surface and is engageable with one of the radially extending slots to drive the star wheel in an incremental angular manner while minimizing load forces on the drive pin, the star wheel and the load to be intermittently driven.

The present invention also relates to a drive mechanism for driving a load which comprises a first rotary member which provides an essentially uniform rotary motion, with the first rotary member comprising a drive pin; and a second rotary member operationally associated with a load which is to be driven. The second rotary member comprises a plurality of radially extending slots which are curved along a substantial portion of a length of the slots; with each of the slots being engageable with the drive pin of the first rotary member during a rotation of the first rotary member, to provide an incremental angular rotation to the second rotary member while a drive pin load on the drive pin and forces applied to the load which is to be intermittently driven remain in control.

The present invention further relates to a projection system for motion picture film which comprises a film gate having a projection aperture, such that film frames of the film move past the projection aperture; a light source; illumination optics for directing light from the light source into the projection aperture of the film gate; a projection lens for projecting an image of each of the film frames onto a screen; a Geneva Mechanism for moving the film progressively past the projection aperture, with the Geneva Mechanism comprising a rotating driver having a drive pin, and a star wheel operationally associated with the film, with the star wheel comprising a plurality of radially extending slots which cooperate with the drive pin of the rotating driver to cause an intermittent rotation of the star wheel upon a rotation of the rotating driver and thereby cause and an intermittent motion of the film; and a shutter mechanism which blocks light incident onto the film frames of the film in synchronization with the intermittent motion of the film. One of the drive pin or the radially extending slots being shaped in a controlled manner to permit the star wheel to reach a peak acceleration and deceleration in a continuous manner.

The present invention further relates to a projection system for film which comprises a film gate having a projection aperture, such that film frames of the film move past the projection aperture; and a drive mechanism for moving the film progressively past the projection aperture. The drive mechanism comprises a first rotary member having a drive pin and a second rotary member operationally associated with film. The second rotary member comprises a plurality of slots which cooperate with the drive pin of the first rotary member to cause an intermittent rotation of the second rotary member and thereby cause an intermittent motion of the film. One of the drive pin or the slots being shaped in a controlled manner to permit the second rotary member to reach a peak acceleration and a peak deceleration in a continuous manner.

BRIEF DESCRIPTION OF THE DRAWINGS

FIG. 15 is a perspective view of a motion picture projector utilizing an improved Geneva mechanism according to the third embodiment.

DETAILED DESCRIPTION OF THE INVENTION

Figure 1A:
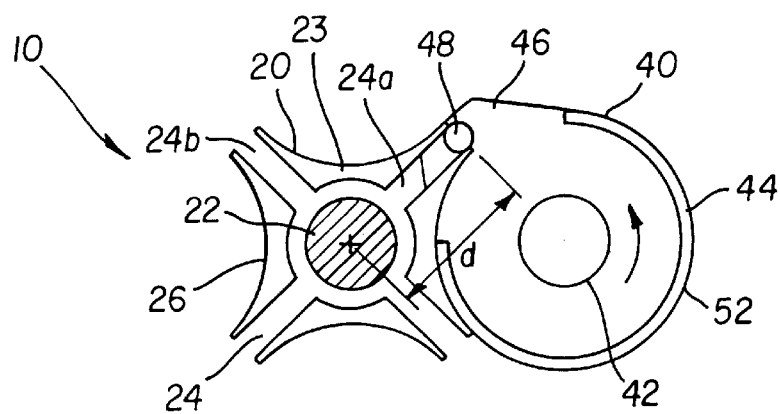
FIGS. 1a–1c are top views of a conventional Geneva Mechanism utilizing a star wheel with four straight slots, shown in three sequential positions during engagement.

Referring now to the drawings, wherein like reference numerals represent identical or corresponding parts throughout the several views, a conventional Geneva Mechanism 10, such as described in U.S. Pat. No. 1,774,789, is shown in FIG. 1a. Geneva Mechanism 10 comprises a driver 40 and a star member 20, which together drive a load, such as film, of a motion picture projector, in a controlled intermittent fashion; while driver 40 itself is driven continuously with essentially constant rotary motion. The angular motion of star member 20 includes an index followed by a dwell for each revolution of driver 40.

Driver 40 typically includes a drive shaft 42, a restraining cam 44, a drive arm 46, and a drive pin 48. Driver 40 is typically attached to a flywheel (not shown) and a drive motor or gear train (also not shown), which provide a constant angular velocity input to driver 40.

Star member 20 comprises a shaft 22, which is attached at one end to a star wheel 23, and at the other end to a load to be driven. In the case of a motion picture projector, a sprocket (not shown) is attached to the shaft 22, and the sprocket in turn engages with the perforations of the film, thereby transferring the intermittent drive motion to the film (not shown). In the typical Geneva Mechanism, the star wheel 23 comprises a number of straight slots 24, the center lines of which extend radially outward from the center of rotation, and where straight slots 24 are positioned at equal angles about the center of rotation. In between straight slots 24 are a number of concave surfaces 26. Concave surfaces 26 and straight slots 24 alternate around the periphery of star wheel 23 and are equal in number.

During an indexing motion, drive pin 48 enters one of straight slots 24, such as straight slot 24a, as shown in FIG. 1a, and then angularly accelerates star member 20 about its center of rotation. This acceleration continues until the midpoint of the indexing motion, shown in FIG. 1b, where drive pin 48 crosses the line joining the centers of rotation of star member 20 and driver 40. At this point star member 20 begins an angular deceleration which continues until drive pin 48 exits straight slot 24a, which is shown if FIG. 1c. The star member 20 attains its maximum angular velocity at the mid-index position shown in FIG. 1b, while in FIGS. 1a and 1c its angular velocity is zero.

Following the indexing motion there occurs a dwell period, during which drive pin 48 is not in engagement with star wheel 23, and driver 40 rotates to complete one revolution such that it subsequently returns to the position shown in FIG. 1a. As drive pin 48 initiates the next index of star member 20, it will engage with a second straight slot 24b. During the dwell period, the star member 20 is restrained from any rotation by the engagement of one of its concave surfaces 26 with convex surface 52 of restraining cam 44 of driver 40.

Figure 2A:
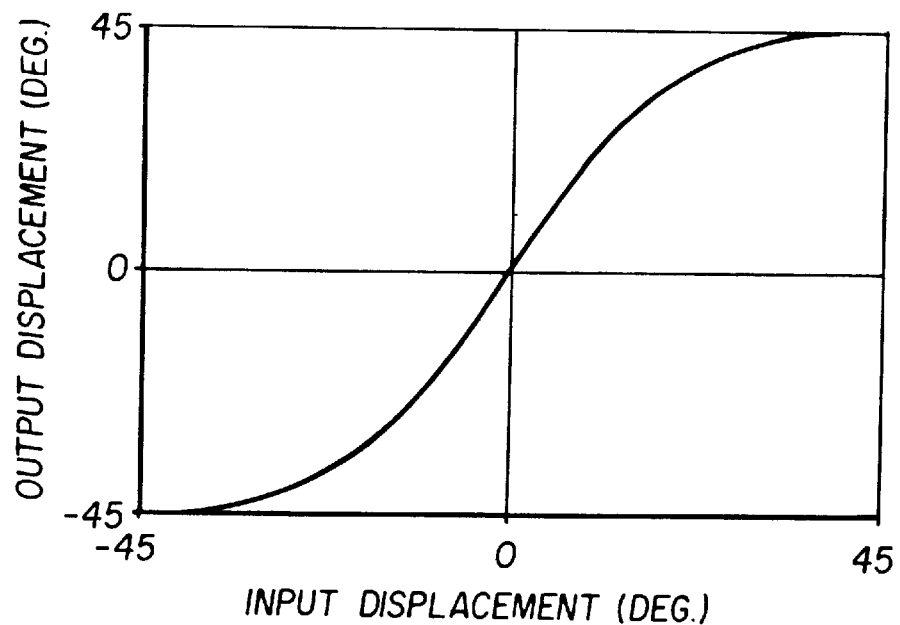
FIGS. 2a–2e are plots of the displacement, velocity, and acceleration of the star wheel, as well as the pin moment arm and the pin load on the star wheel driver, as experienced by the aforementioned components in a conventional Geneva Mechanism, the star wheel of which has straight slots.
Figure 2B:
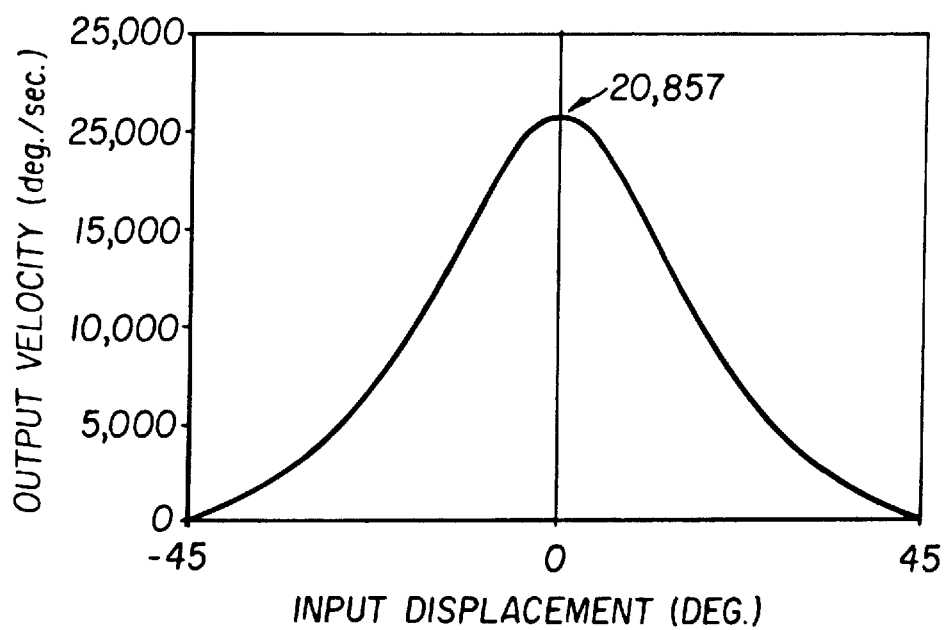
Figure 2C:
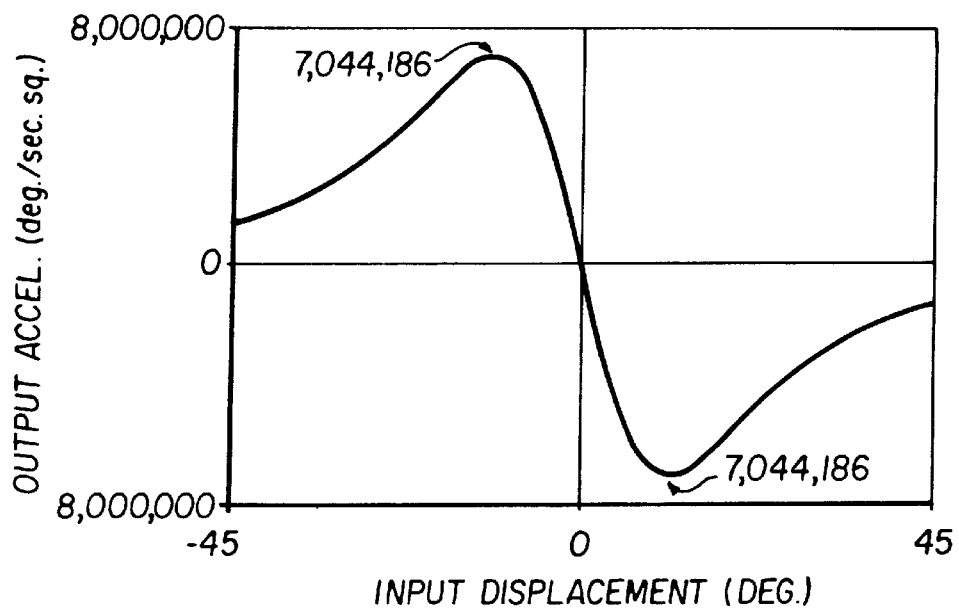

FIGS. 2a, 2b, and 2c are plots of angular displacement, angular velocity, and angular acceleration, respectively, of star member 20 versus angular displacement of driver 40, for a conventional Geneva Mechanism with four straight slots as shown in FIG. 1a. The values of velocity and acceleration are calculated for a Geneva Mechanism operating in a motion picture projector running at 24 frames per second. The peak velocity is 20,857 deg./sec., and the peak acceleration is 7,044,186 deg./sec$^2$. It can be seen that the motion begins at a driver angular position of −45° and ends at a driver angular position of +45°. For the first, say, 20° of driver rotation (between input displacement angles of −45° and −25°), the displacement curve is fairly flat, and the velocity and acceleration are relatively low. A similar period of relatively little motion occurs in the final 20° of driver rotation. The motion is slow to get going, and just as slow to get stopped; however, in a motion picture projector the shutter must be closed during much of this time, because the film is moving. Failure to blank the screen during this period of film motion results in vertical smear, also known as "travel ghost."

For FIGS. 2a–2c, the curves are independent of the physical size of the mechanism. Commonly used motion projectors of different brands use a variety of Geneva Mechanism component sizes. The curves in FIGS. 2a–2c apply to all these parts, regardless of size. The magnitude of the velocity and acceleration values depend only on the frame rate, and are calculated here for 24 frames per second.

Figure 1B:
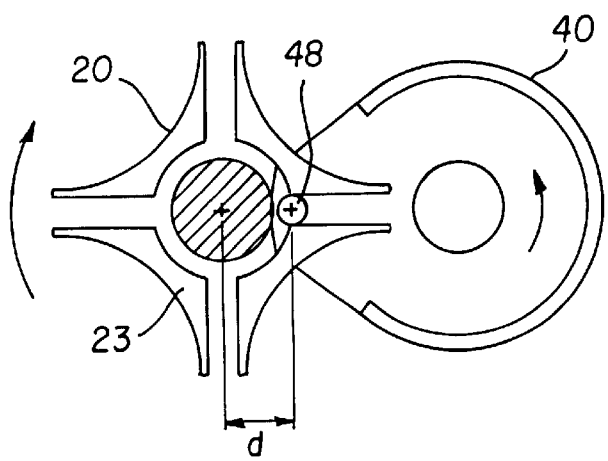
Figure 1C:
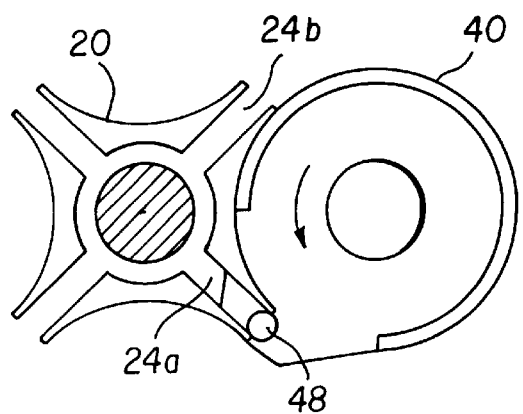
Figure 2D:
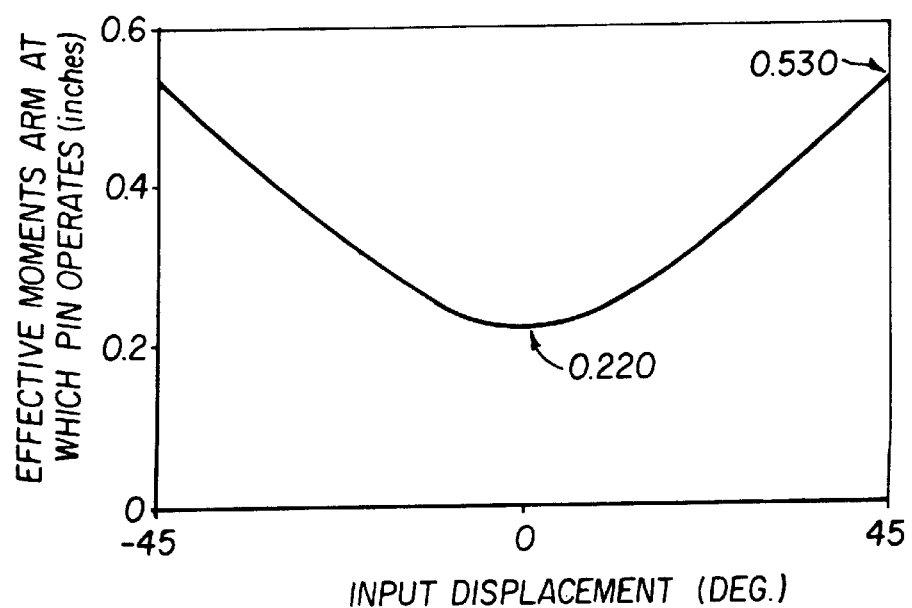

FIG. 2d shows how the pin moment arm varies with respect to the angular displacement of the driver. The pin moment arm is the distance from the center of rotation of star wheel 23 to the line of action of the contact force between drive pin 48 and the star wheel slot 24. In conventional Geneva Mechanisms with straight radial slots, this effective pin moment arm is also equal to the actual radius of the center of pin 48 from the star wheel center. The distance from the star wheel center to the pin center is labeled as "d" in FIGS. 1a and 1b, and in FIG. 1a it is more than twice as large as it is in FIG. 1b. The effective operating pin moment arm is important, because the angular acceleration of the star wheel is caused by the application of torque to the star wheel, and that torque is equal to the normal force at the point where drive pin 48 contacts slot 24, multiplied by the effective pin moment arm at which the normal force acts about the star wheel center. FIG. 2d shows that for the conventional Geneva Mechanism of FIGS. 1a–1c, the effective pin moment arm at mid-index is only about 42% of the pin moment arm at the beginning and end of index, that is, the moment arm varies between 0.530 and 0.220 inches for a mechanism sized to operate on 0.750 inch center distance. For descriptive purposes, in this example, and for all other examples examined, the Geneva Mechanism components are sized such that the center distance between the driver and star wheel rotation centers is 0.750 inch, which is the center distance employed in a popular brand of motion picture projector.

Figure 2E:
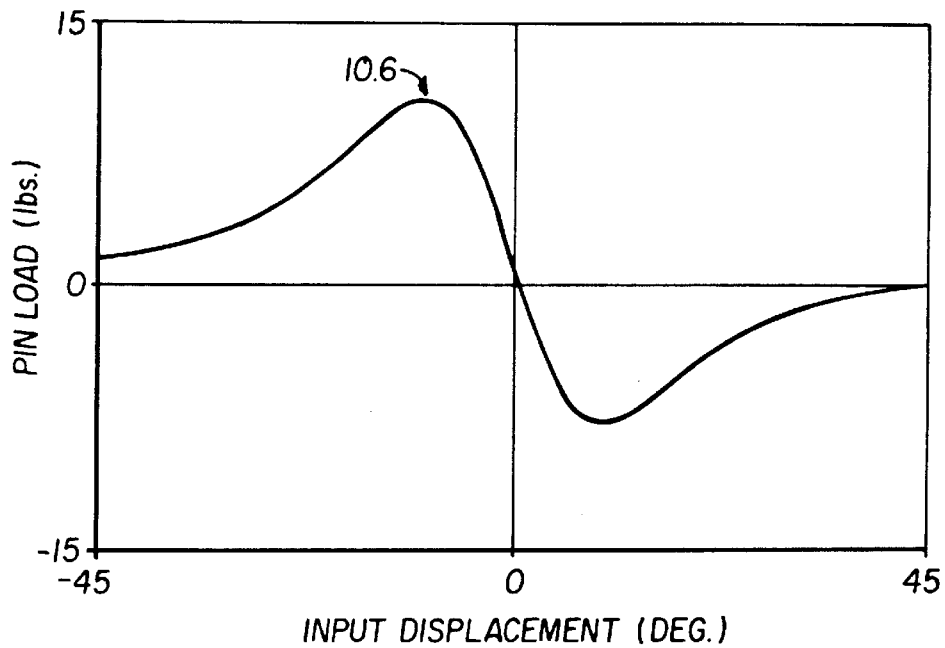

FIG. 2e shows how the load on drive pin 48 varies with the input displacement. To create this model, the operating conditions of the same popular brand of motion picture projector were incorporated, such as a 0.750 inch center distance, the inertia of the star member and sprocket (0.0003 oz-in-sec$^2$), the projection rate of 24 frames per second, and drag imparted to the film by the gate (5.5 oz). The peak pin load is 10.6 pounds.

Figure 3:
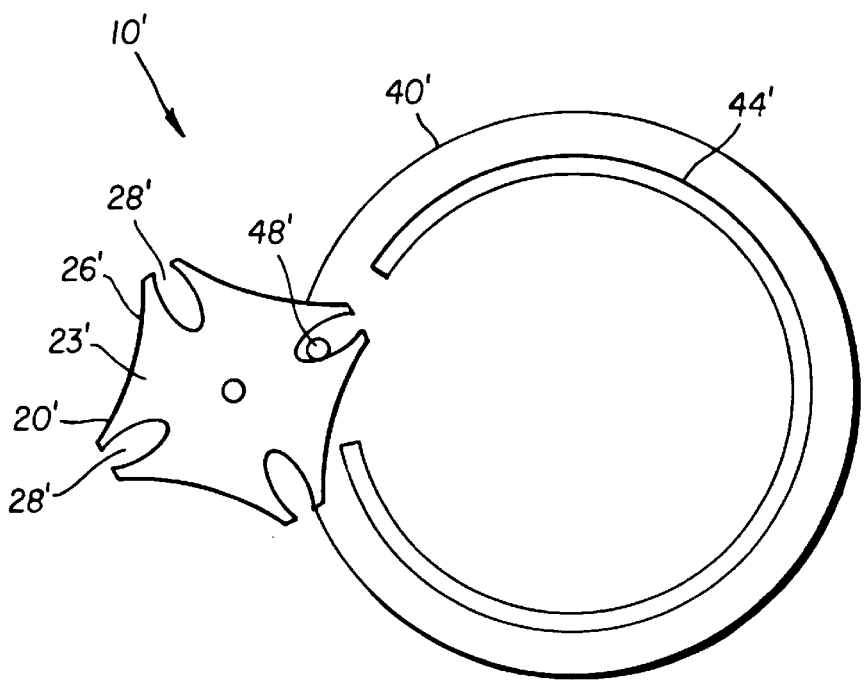
FIG. 3 is a top view of a prior art Geneva Mechanism with a star wheel with curved slots.

FIG. 3 shows a Geneva Mechanism with curved slots, which are concave along their entire length as shown in, for example, U.S. Pat. No. 1,801,969. U.S. Pat. No. 1,801,969 proposes a modified Geneva Mechanism 10' which operates over much shorter input displacement angles than the mechanism in FIG. 1a, and therefore would index in much less time, for mechanisms operating at the same number of frames per second. Specifically, designs are presented in U.S. Pat. No. 1,801,969 for mechanisms which operate over one-eighth, one-tenth and one-twelfth of a driver revolution, compared with one-fourth of a driver revolution required by the mechanism in FIG. 1a, so the proposed mechanisms would index in 50%, 40%, and 33.33% of the time it takes a conventional Geneva Mechanism to index, respectively. Furthermore, U.S. Pat. No. 1,801,969 proposes that the acceleration of the star wheel be a positive constant value for the first half of the index, and an equal and opposite negative constant value for the second half.

Geneva Mechanism 10' shown in FIG. 3 is a design per U.S. Pat. No. 1,801,969, which is intended to index in one-eighth of a driver revolution. It is similar to the Geneva Mechanism 10 shown in FIG. 1a in that it possesses a driver 40', a star member 20' and a star wheel 23'. The driver has a pin 48' and a restraining cam 44', though not a driving arm 46. Star member 20' has concave surfaces 26', which interact with restraining cam 44', and slots with curved surfaces 28', which interact with drive pin 48'. The curved slot profiles are the result of following a displacement vs. time profile, which has constant acceleration. As shown in FIG. 3 this mechanism has partially completed an index.

Figure 4A:
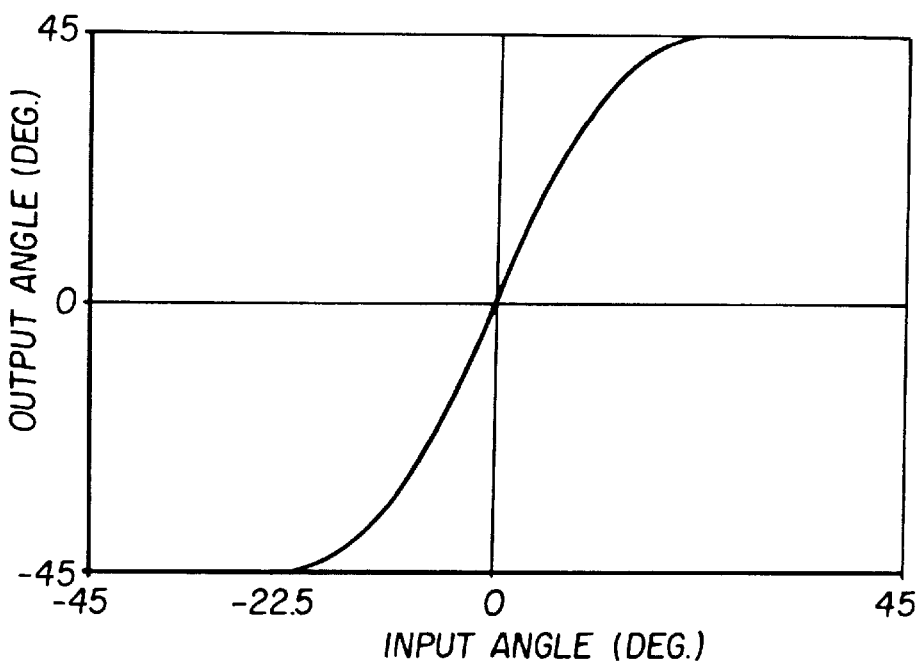
FIGS. 4a–4e are plots of the displacement, velocity, and acceleration of the star wheel, as well as the pin moment arm and the pin load on the star wheel driver, as experienced by the aforementioned components in the Geneva Mechanism of FIG. 3, the star wheel of which has curved slots.
Figure 4B:
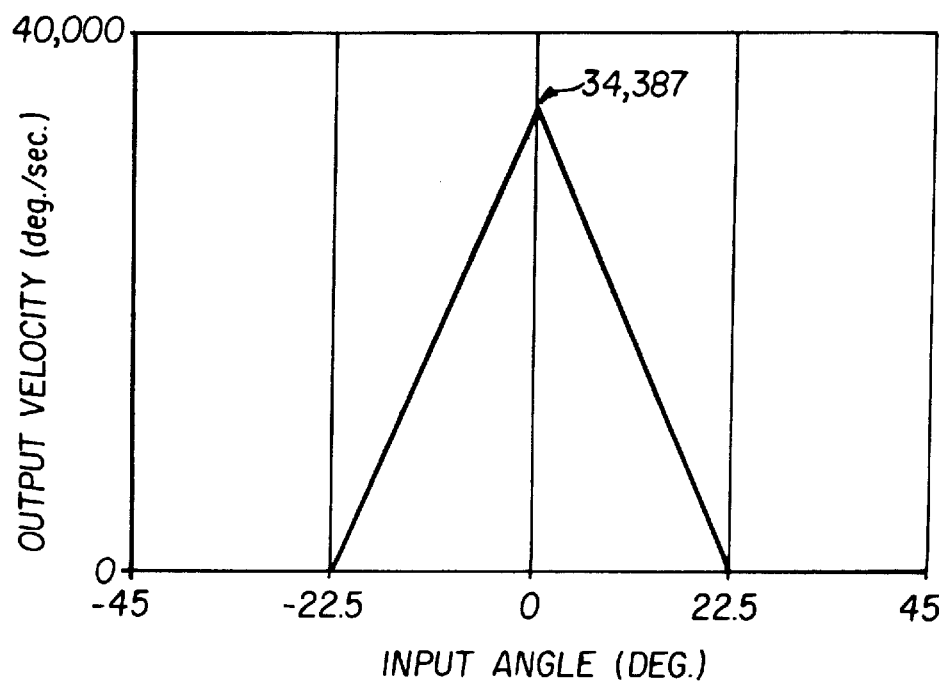
Figure 4C:
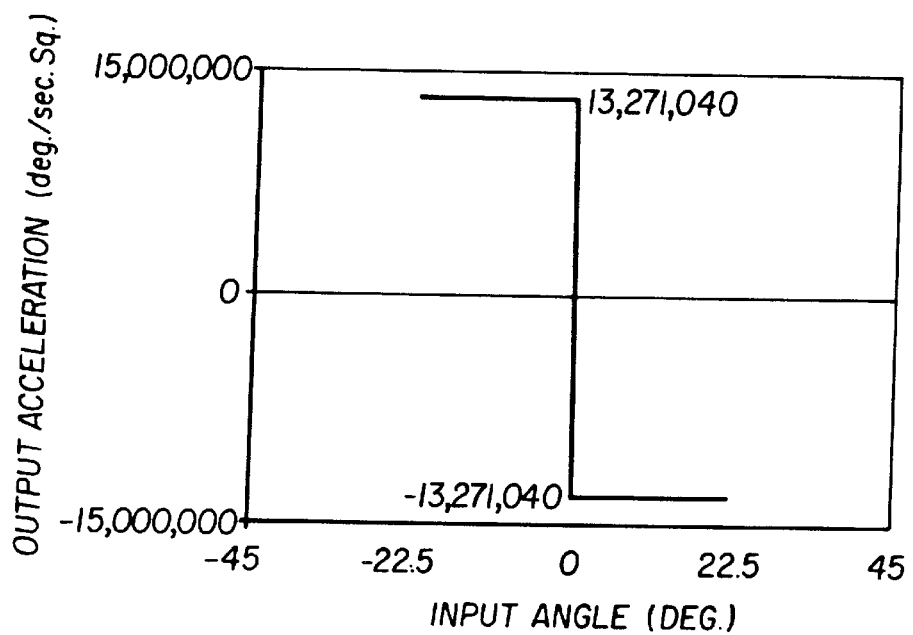

FIGS. 4a through 4e are plots of the performance for the mechanism of FIG. 3, which indexes in one-eighth of a driver revolution, or 45°, and is operating at 24 frames per second. FIGS. 4a, 4b, and 4c are plots of the displacement, velocity, and acceleration respectively. FIG. 4c shows that the acceleration is a positive constant value for the first half of the index, followed by an equal and opposite negative constant value. The magnitude of this acceleration (13.3 million deg./sec$^2$) is 188% of the magnitude of the acceleration for the mechanism of FIGS. 1a–1c (7.0 million deg./sec$^2$), shown in FIG. 2c, operating at the same projection rate. It is reasonable to assume that the accompanying increase in deceleration will necessitate an increase in film gate drag to prevent picture jump. Thus the drag must be increased as the deceleration rate increases, and the increased magnitude of acceleration will result in a contact force between the sprocket pins and film perforations which is 188% of the force experienced in the mechanism of FIGS. 1a–1c. (For the mechanism described in U.S. Pat. No. 1,801,969, which operates in one-twelfth of a driver revolution, for which displacement, velocity, and acceleration curves are not shown, this force is 424% of the contact force in the FIG. 1 mechanism.) Based on state of the art projection practices, these elevated forces would lead to unacceptable premature wear of the perforations in the film, and of the sprocket teeth. This constitutes a first failure of the design of FIG. 3.

Figure 4D:
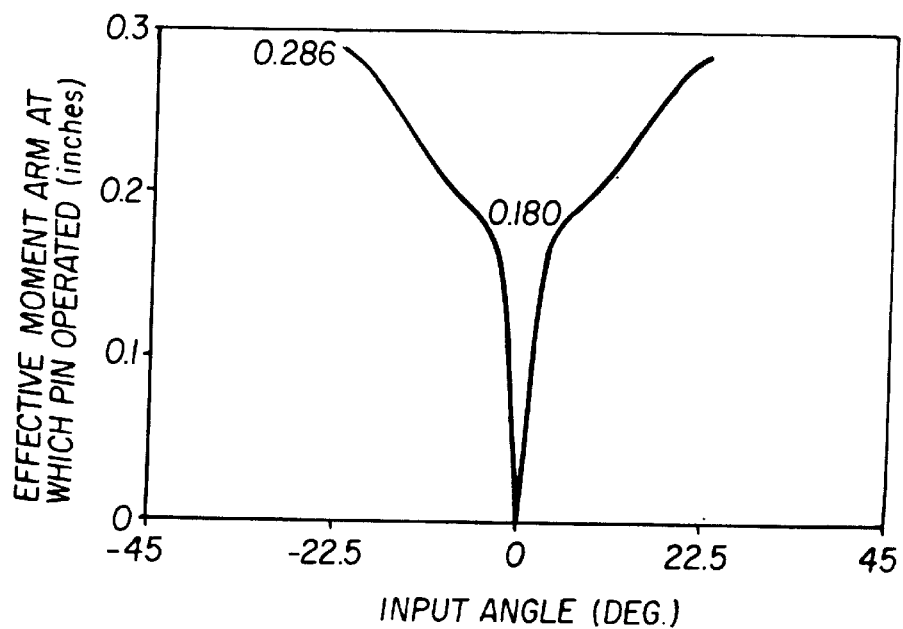
Figure 4E:
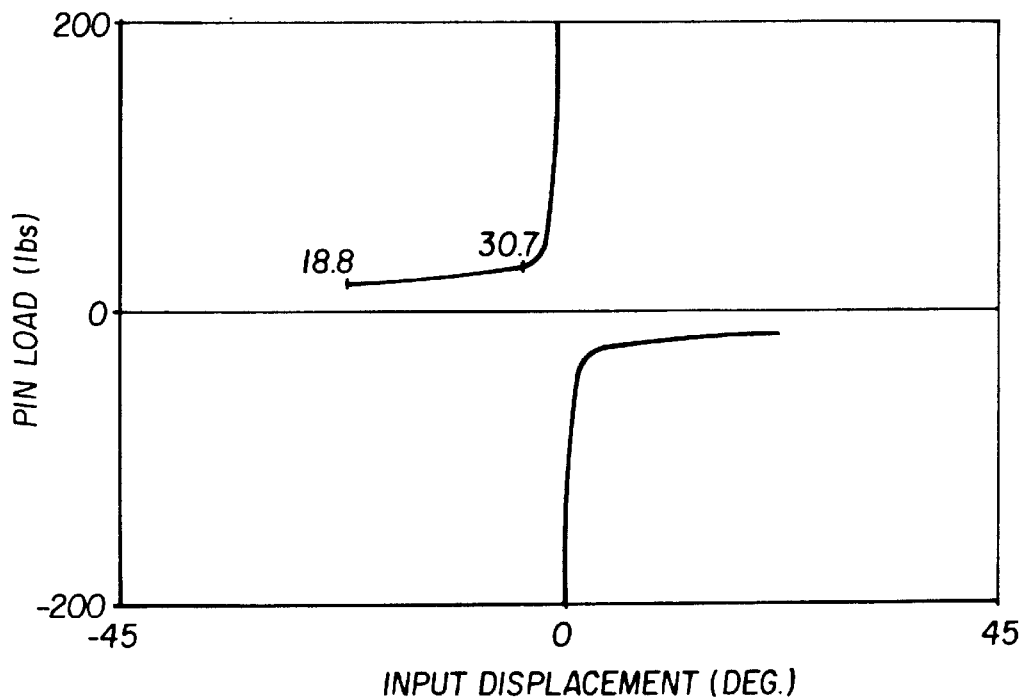
Figure 5A:
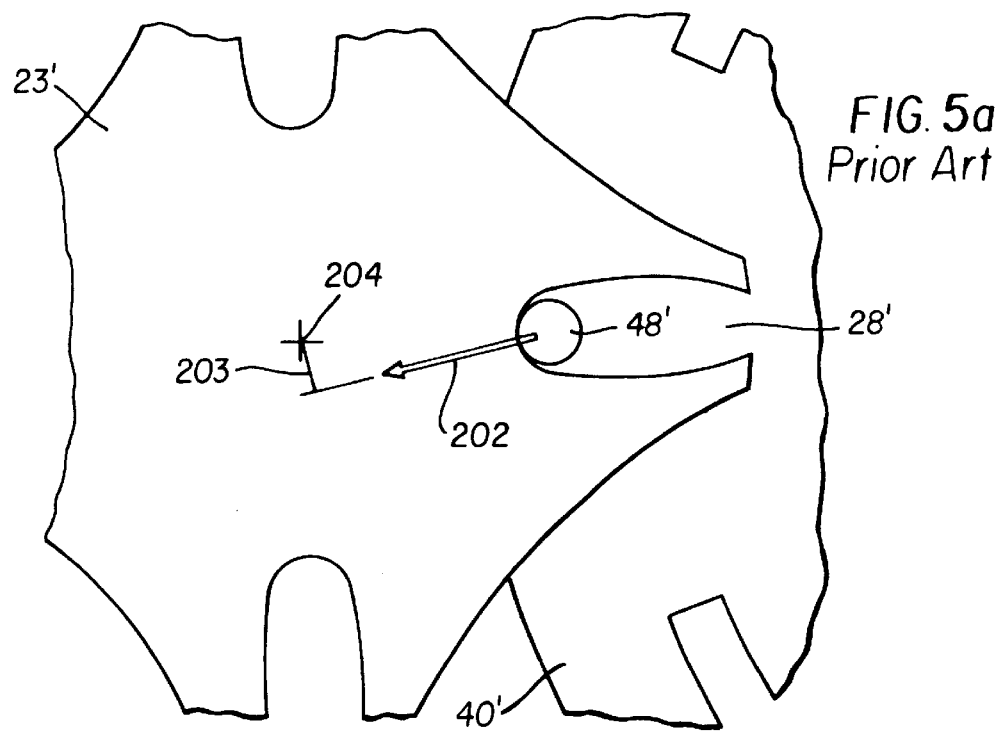
FIGS. 5a–5c are top views of a prior art Geneva Mechanism with a star wheel with curved slots as shown in FIG. 3, showing details of the geometry.

FIG. 4d shows the effective pin moment arm at which the normal force between the pin and the slot is operating about the star wheel center to produce torque, for the FIG. 3 mechanism indexing in one-eighth of a driver revolution. Due to the geometry of the slot, the effective pin moment arm becomes very small near mid-index, and in fact is zero at mid-index. Since T=Fr (torque equals force times radius), it can also be seen that F=T/r and that, for a constant torque which U.S. Pat. No. 1,801,969 proposes, the force between the pin and the slot wall increases without bound as the effective pin moment arm approaches zero. A detail showing why this effective pin moment arm approaches zero is shown in FIG. 5a, which is a magnified detail of the mechanism as it approaches mid-index. Driver pin 48' of driver 40' is applying a normal force vector 202 to the wall of curved slot 28' in star wheel 23'. This normal force vector 202 is operating at a very small effective pin moment arm 203 about the star wheel rotation center 204, the result of which is that a very large force is required to produce the acceleration values in FIG. 4c. This effective pin moment arm 203 continues to decrease in length as the mechanism continues to approach mid-index, and yet, as can be seen in FIG. 4c, the torque being transmitted (which is proportional to acceleration) remains high and constant until mid-index is actually reached. A plot of the force of drive pin 48' against curved slot wall 28' throughout an index is shown in FIG. 4e. The force becomes uncontrolled (goes to ∞) at mid-index. This condition is even more severe for mechanisms of the type shown in FIGS. 3 and 5a, but which operate in one-tenth and one-twelfth of a revolution, because the acceleration forces are even higher, and yet the effective pin moment arm approaches zero as it does with the one-eighth revolution design. The extremely high forces at mid-index would cause a mechanical failure of drive pin 48' or of star wheel curved slot 28', or both, which constitutes a second failure of the design of FIG. 3.

Figure 5B:
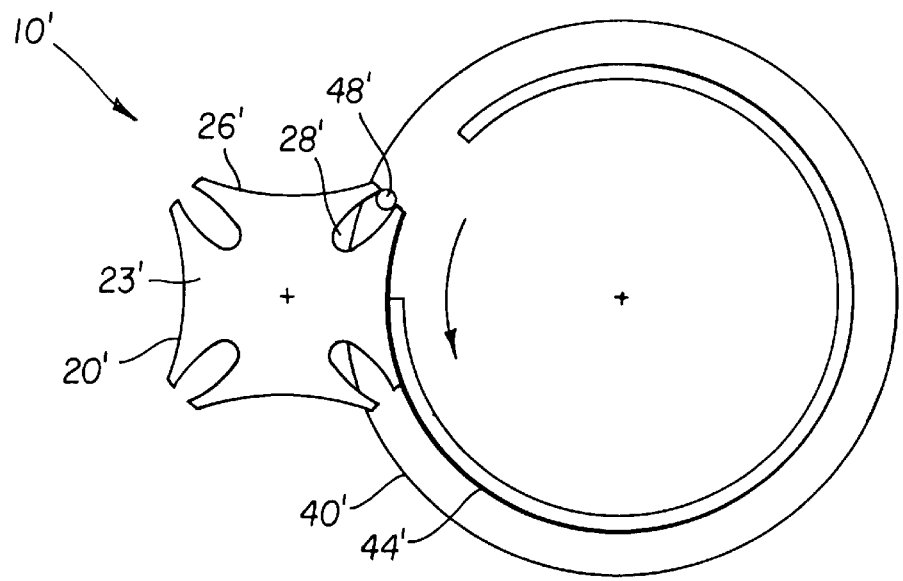
Figure 5C:
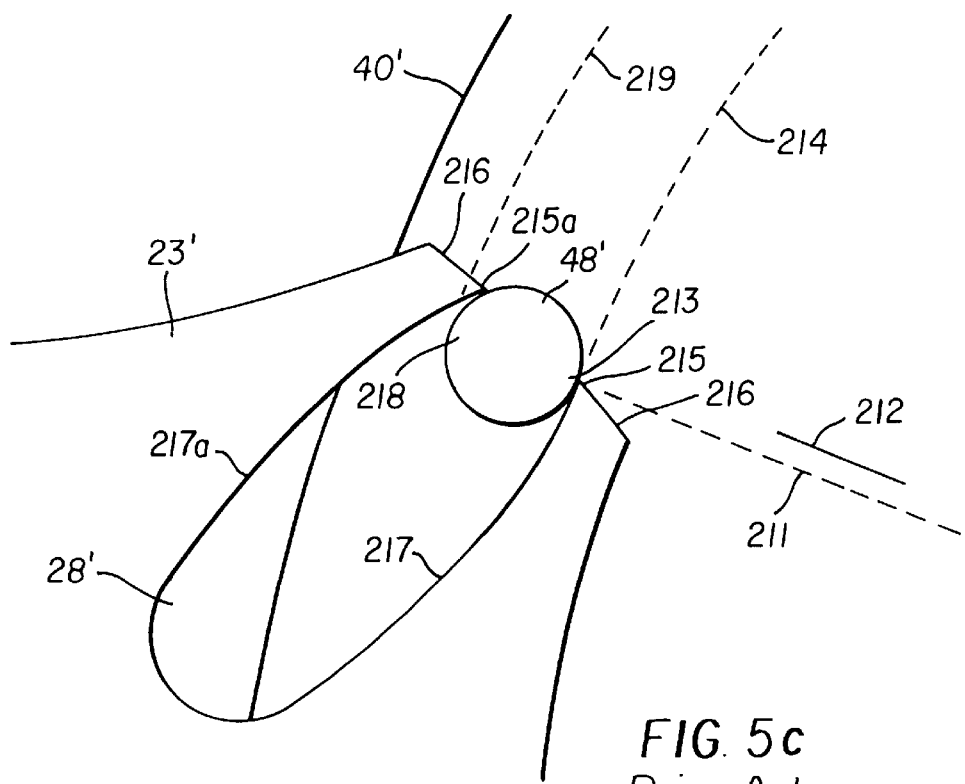

FIG. 5b shows a view of pin 48' entering curved slot 28' of star wheel 23' at the very beginning of the index, for the mechanism which indexes in one-eighth of a driver revolution. FIG. 5c is a magnified detail of the area surrounding pin 48' in FIG. 5b. In the position shown, the index is just beginning. Drive pin 48' is rotating about the driver center, which is out of the picture in FIG. 5c, but is located on radial line 211 in the direction shown by locating arrow 212. The point on drive pin 48' which is closest to the driver rotation center is shown at 213, and as this point approaches engagement with star wheel 23' it describes arc 214. As it begins engagement with star wheel 23', pin 48' must bear on the slot wall at first contact point 215, in order to begin the angular acceleration of star wheel 23'. The outside diameter of star wheel 23', therefore, must be at least as large as the circle which includes arced surfaces 216, in order for star wheel 23' to be in physical contact with drive pin 48' in the position shown (first contact point 215), so that acceleration can begin. Furthermore, first contact point 215 and slot wall 217 must be present in mirror image form on the opposite side of the slot, shown as 215a and 217a, in order to produce the deceleration profile required at the end of the index. However, point 218 on drive pin 48' which is farthest from the driver rotation center will describe arc 219 as the pin approaches the start of engagement with star wheel 23'. It is clear that the path of pin 48' shown as arc 219 interferes with point 215a and a portion of slot wall 217a, so it is impossible for this mechanism to function. In fact, the opening between first contact point 215 and point 215a is considerably smaller than the diameter of drive pin 48', so, regardless of what path pin 48' follows as it approaches slot 28', it is impossible for pin 48' to fit through the opening at the end of the slot, so it is impossible for the pin to enter or exit the slot. This effect is even more severe for the mechanisms disclosed in U.S. Pat. No. 1,801,969, which operate in one-tenth and one-twelfth of a revolution, because the off-axis angle at which drive pin 48' approaches curved slots 28' is even greater, the result of which is that the slot openings are even smaller. This inability of pin 48' to enter or exit star wheel slots 28' constitutes a third failure of the design of FIG. 3.

As has already been stated, Geneva Mechanism 10, as shown in FIGS. 1a–1c, which has four straight slots 24, possesses an acceleration vs. time profile the shape of which cannot be changed, other than in its magnitude, which can be varied by operating the mechanism at faster or slower speeds. This profile is shown in FIG. 2c. It has also been stated that for a mechanism, which is desired to have a fixed displacement in a short time, with controlled acceleration, the Geneva Mechanism with four straight slots 24 is not optimum, because it wastes valuable time by accelerating slowly, then reaches a much higher peak acceleration just before mid-index. A more advantageous acceleration vs. time profile would go to a high fixed value immediately and remain constant for half the index, then have an equal and opposite deceleration to a stop. It is this profile which is shown in FIG. 4c. However, the design of FIG. 3 of which profile acceleration vs. time profile is shown in FIG. 4c, suffers from three failures which have been discussed, which are (1) damaging high accelerations, (2) runaway high pin force near mid-index, and (3) a slot mouth which is smaller than the drive pin diameter and which therefore cannot function.

These are not the only problems with the design of FIG. 3. By specifying an acceleration profile, shown in FIG. 4c, which is a step function and therefore is discontinuous, the design of FIG. 3 creates an infinite jerk condition, which is known in the art to be potentially damaging to mechanical parts operating at high speed. Furthermore, when reasonable manufacturing tolerances and assembly clearances are taken into consideration, it is expected that the transfer of control of star wheel 23 from the cams engagement with the concave star wheel surface (44 and 26, FIG. 1a) to the drive pin engaging with the straight slot (48 and 24a, FIG. 1a) will be slightly imprecise. If this is so, any acceleration profile which steps discontinuously to a high constant value will result in a high momentary load once the inevitable small lost motion is taken up. For this reason, such a step at the beginning of the acceleration profile is undesirable.

Furthermore, an acceleration profile which remains at a high constant value until mid-index will always result in a "scoop bottom" slot profile, which in turn will always produce an effective operating pin moment arm which approaches zero as shown in FIG. 5a, and result in runaway pin forces. For this reason, a step in the acceleration profile at mid-index is also undesirable.

Figure 6A:
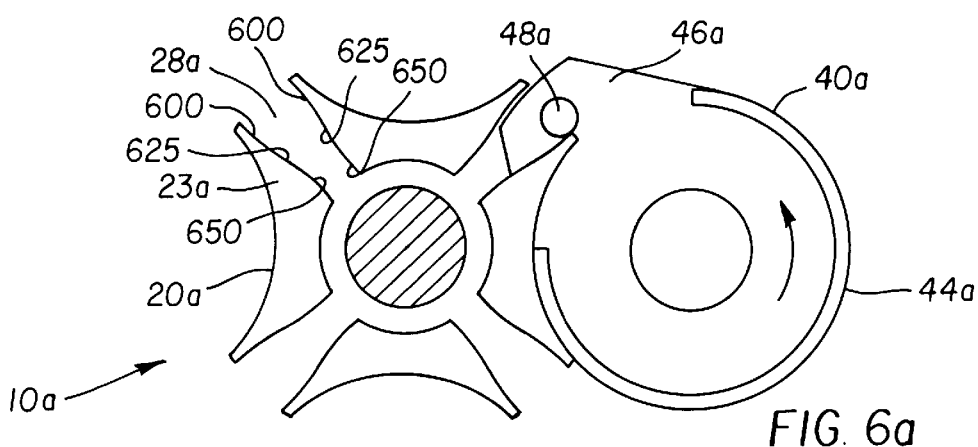
FIG. 6a is a top view of a Geneva Mechanism according to the first embodiment of the present invention.

An optimized Geneva Mechanism will combine aspects of the conventional design with straight slots 24 (as in FIG. 1a), with the curved slots 28' as in FIG. 3, while overcoming the deficiencies present in either of the two designs. Namely, an improved Geneva Mechanism 10a as shown in FIG. 6a will provide an acceleration profile that is at a high value for most of its duration, but then will be rounded or tapered at the beginning, at the end, and at mid-index. Reviewing the acceleration profile in FIG. 2c, it is apparent that the curve between the points of maximum and minimum acceleration does not resemble a step, but instead resembles a sine curve, or perhaps two parabolas. Since this is the profile which is produced by straight radial slot 24 in star wheel 23 in FIG. 1a, and since this star wheel with straight radial slots 24 possesses the maximum possible pin moment arm at all times (because any deviation from a radial slot will result in a decrease in the effective pin moment arm), an acceleration profile which includes a sine-like curve at mid-index will result in the lowest possible pin forces, and is desirable. A similarly shaped modification to the acceleration profile at the beginning and end of index will eliminate the discontinuity in acceleration, and eliminate the resulting infinite jerk.

Figure 7A:
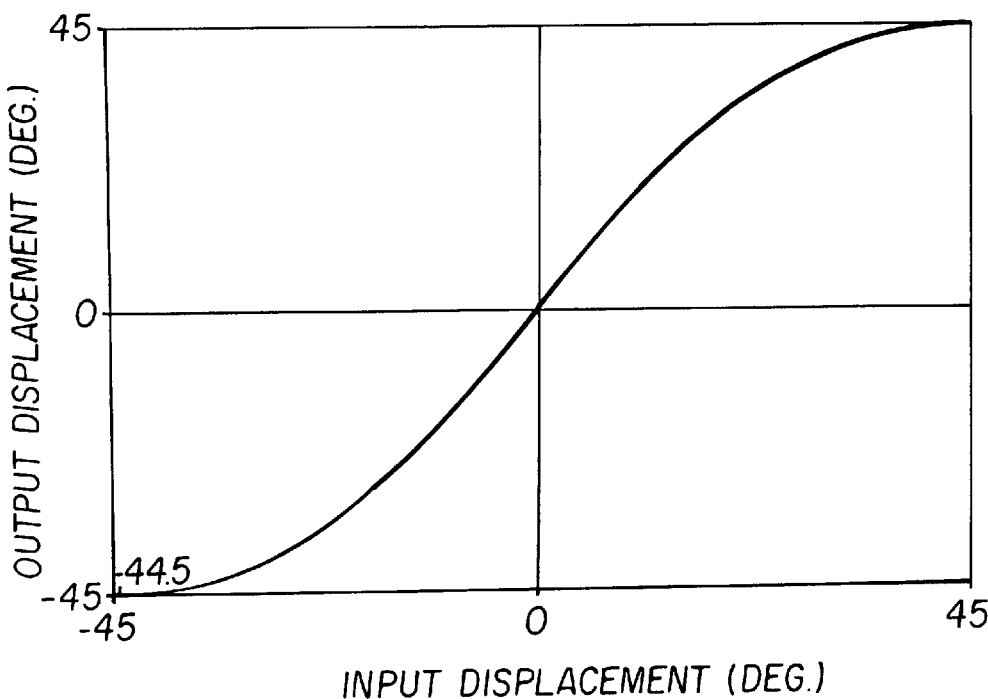
FIGS. 7a–7e are plots of the displacement, velocity, and acceleration of the star wheel, as well as the pin moment arm and the pin load on the star wheel driver, as experienced by the aforementioned components in a Geneva Mechanism according to the first embodiment of the present invention.
Figure 7B:
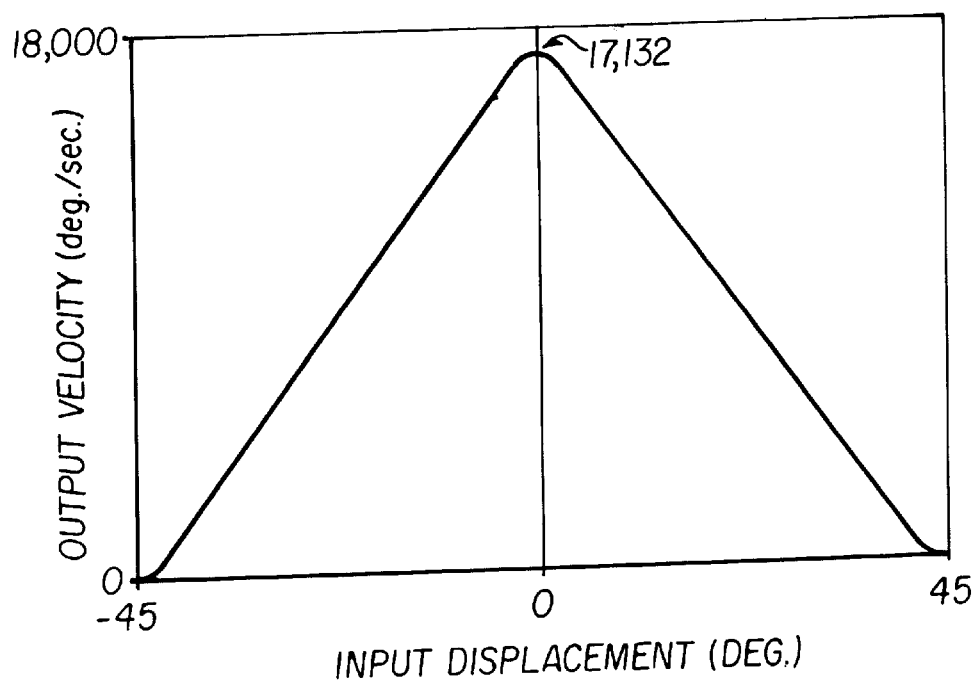
Figure 7C:
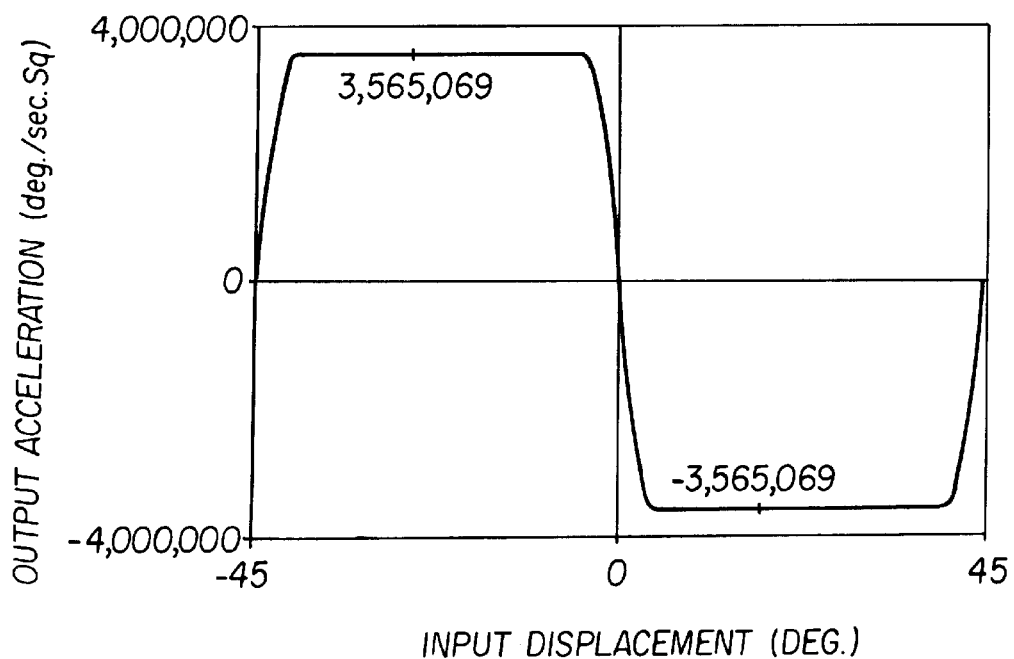

If one considers for the moment the first half of the acceleration profile only (and assumes that the second half, or deceleration, profile will be its equal and opposite), the embodiments of the present invention which are described below utilize a parabolic acceleration profile for the first 10% of the time during which acceleration occurs, a straight line profile for the next 80% of the profile, and another parabolic profile for the final 10% which immediately precedes mid-index. These two curved profiles could be any one of a number of shapes, such as sinusoidal, parabolic, or cubic. Similarly, the 10% profile modification at the beginning and the end could be some other value, in the order of 5%–20%. However, an ascending curve and descending curve of relatively short durations, which are joined to a straight line in a tangent manner, constitute an acceleration profile which will accomplish a desired displacement in a short period of time, with minimized peak acceleration, finite jerk, and controlled pin load at mid-index. An acceleration profile possessing these properties is shown in FIG. 7c.

In addition to the choice of the shape or profile of the acceleration curve, an input variable which is necessary to define the acceleration curve is the input angle, or the angle through which the driver 40 rotates to produce 90° of star wheel rotation. For Geneva Mechanism 10 with straight slots 24 shown in FIG. 1a, this input angle is 90°. For Geneva Mechanism 10' shown in FIG. 3, it is 45°. In the present invention this angle is an input variable, and may be adjusted at will. Keep in mind that the lower this number is, the shorter the time required to index the star wheel 23 will be.

Using a convenient modeling method such as dividing the index into small finite steps, the acceleration profile may be integrated once to obtain velocity (with initial velocity of zero), and integrated again to find the displacement profile (with an initial displacement representing the starting position of star wheel 23). The scalar magnitude of the entire acceleration profile can then be adjusted by multiplying all points by an acceleration constant, until the resulting double integral, or angular displacement of star wheel 23 from start of motion to mid-index, is equal to the desired value, in this case 45°. In this manner a displacement curve which covers a desired displacement and possesses a desired acceleration vs. time profile is easily generated.

For a first embodiment of the present invention, a star wheel 23a with slots 28a (as shown in FIG. 6a) was designed to index in essentially the same time as the conventional Geneva Mechanism used in motion picture projectors. Each wall of slot 28a defines a smooth surface which is curved along a substantial portion of its length. More specifically, each wall of slot 28a is shaped in a controlled manner and includes a concave portion 600, a slightly convex portion 625 and a straight portion 650 and thus the two walls are mirror images of each other. The displacement profile for Geneva Mechanism 10a, as shown in FIG. 7a, is generally similar in appearance to that of Geneva Mechanism 10, as was shown in FIG. 2a. However, Geneva Mechanism 10a of FIG. 6a shows both an improved velocity profile (FIG. 7b), and acceleration profile (FIG. 7c). The peak velocity shown in FIG. 7b is 17,132 deg./sec., or 82% of the mechanism velocity in FIG. 2b. The peak acceleration in FIG. 7c is 3,565,069 deg./sec$^2$, or 51% of the mechanism acceleration in FIG. 2c. In actuality, the acceleration profile (FIG. 7c) was generated first, and then was integrated once and twice respectively to generate the velocity and displacement profiles (FIGS. 7b and 7a).

Figure 8A:
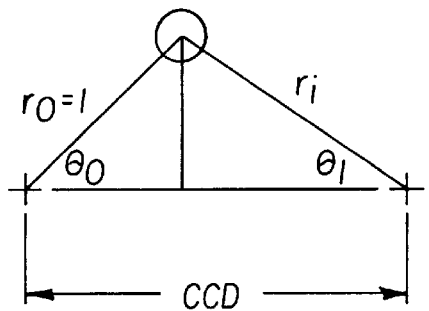
FIGS. 8a–8b represent the layout of the centers of rotation and radii of the driver and star wheel in the present invention.

To model the improved Geneva Mechanism 10a of FIG. 6a, a physical geometry of star wheel 23a and driver 40a was derived, in which the input radius ($r_i$) from the center of rotation of the driver to the center of a drive pin 48a is computed. The output half angle is 45°, and a value for the input half angle ($\theta_i$) has been chosen. As can be seen in FIG. 8a, the input radius is computed by $$r_i \sin(\theta_i) = r_o \sin(\theta_o)$$

which reduces to $$r_i = r_o \sin(\theta_o) \sin(\theta_i)$$

and the conjugate center distance (CCD) is computed by $$CCD = r_i \cos(\theta_i) + r_o \cos(\theta_o) = r_o \{ [\sin(\theta_o)/\tan(\theta_i)] + \cos(\theta_o)\}$$

which is the distance from the center of driver 40a to the center of star wheel 23a.

Figure 8B:
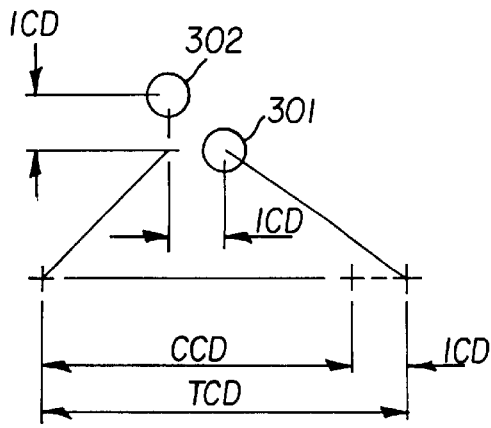

The implementation of another input variable is necessary in order to avoid the pin-slot interference problem from which the design of FIG. 5c suffers. An incremental center distance adjustment (ICD) is added to the conjugate center distance (CCD) as shown in FIG. 8b. This means that for drive pin 301, its center as it enters the slot is no longer coincident with the point at the end of the output radius as shown in FIG. 8a, but the pin 301 center (entering the slot) is moved to the right as shown in FIG. 8b. Furthermore, since the exit profile is the mirror image of the entrance profile about the slot center line, the position of the center of drive pin 302 as it exits the slot will also be shifted. Because $\theta_o$ is 45° for all star wheels 23a with four slots, the distance from the center of the pin 301 (entering the slot) to the center of pin 302 (exiting the slot) is therefore √2(ICD), and the mouth of the slot is effectively opened to prevent the interference incurred by the design as shown in FIG. 5c. The total center distance (TCD) on which the present invention will operate is the sum of the conjugate center distance (CCD) and incremental center distance (ICD):

$$TCD = CCD + ICD$$

The total center distance (TCD) may then be set equal to the desired actual center distance for the mechanism in question. As an operative illustrative example, for all embodiments described here the center distance is 0.750 inch, however, it is recognized that the center distance is a design variable. From this, physical values for ICD and CCD may be calculated, and from CCD values for $r_o$ and $r_i$ may be calculated.

Figure 8C:
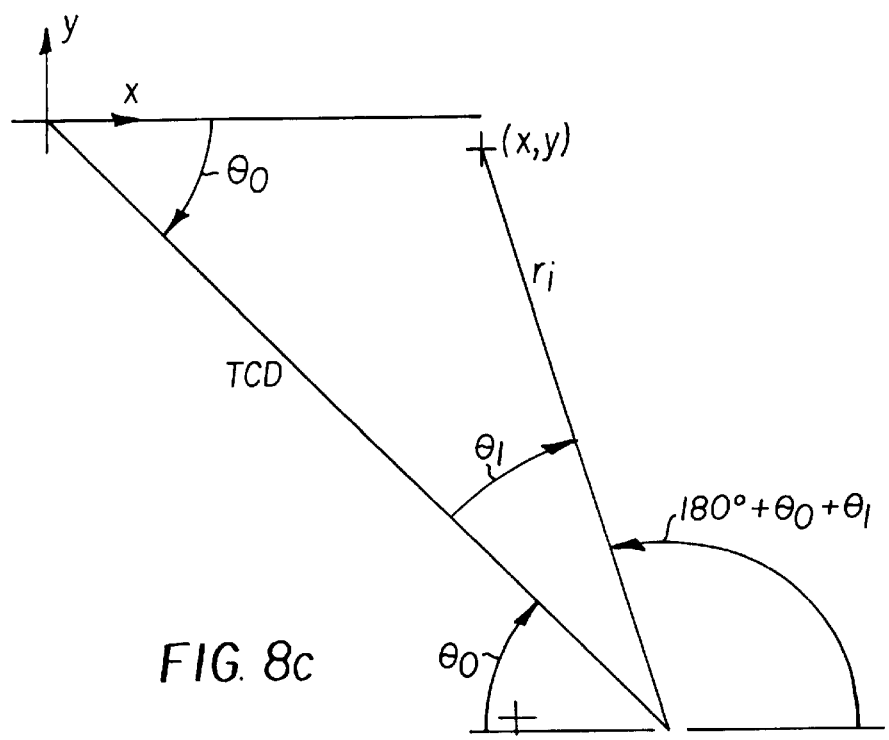
FIG. 8c shows the inversion of the mechanism by which the pin center path is established.

The displacement (output angle) values have been calculated for the desired range of input displacement angles using a stepwise integration method. Next, the location of the pin center in star wheel 23a may be calculated for each of these steps. This is performed by inverting the mechanism so that star wheel 23a is fixed in space, as shown in FIG. 8c. With known values for TCD and $r_i$, the location of the pin center may be computed for every step for which $\theta_i$ and $\theta_o$ are known, and a pin center path is constructed by connecting these points. The coordinates of these points are:

$$y = TCD \sin(\theta_o) + r_i \sin(180° + \theta_o + \theta_i)$$

$$x = TCD \cos(\theta_o) + r_i \cos(180° + \theta_o + \theta_i)$$

(Both $\theta_o$ and $\theta_i$ are negative in value during the first half of the index.)

Figure 6B:
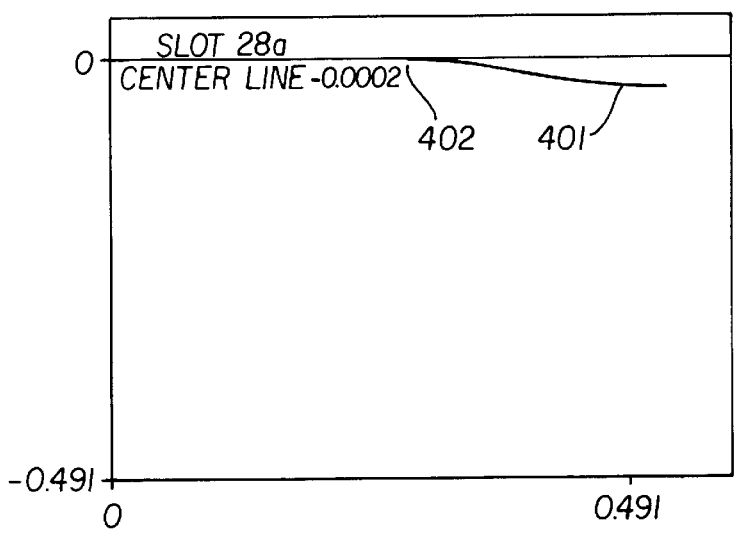
FIG. 6b is a plot of the pin center path in the star wheel member of the first embodiment of the present invention.
Figure 6C:
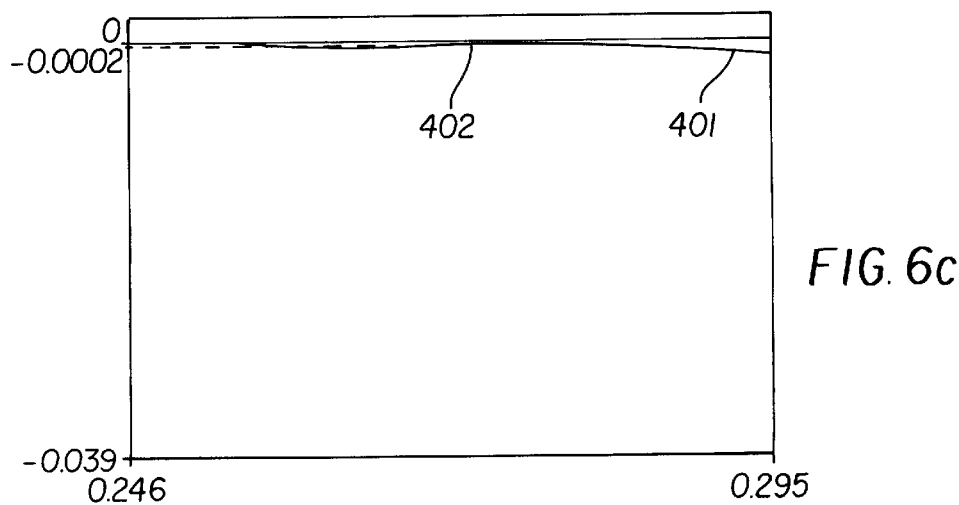
FIG. 6c is a magnified detail of the plot of FIG. 6b.

A plot of a pin center path 401 for the first embodiment of the invention (FIG. 6a) is shown in FIG. 6b, and FIG. 6c is a detail showing a magnified portion of that path. An important and necessary feature of this path is that it becomes nearly tangent to the x-axis at the point identified as 402, where y=−0.0002 inch. Implementation of the present invention involves making this y-value very nearly zero, and then altering the pin center path 401 to the left of this point of near-tangency 402, such that a straight line described by y=0 is substituted for the portion of the pin center path 401 to the left of the point 402. The result is that, to the left of the point 402, curved slot 28a becomes straight, radial and equal in width to the diameter of drive pin 48a. This is the straight portion 650 of slot 28a shown in FIG. 6a. In other words, this deepest portion of curved slot 28a (nearest the star wheel center) is identical to a conventional Geneva Mechanism slot, that is, a Geneva Mechanism with straight slots 24, as is pictured in FIG. 1a. Furthermore, curved slot 28a is provided with extra depth beyond the deepest engagement of drive pin 48a (or alternatively is made to extend through the center of the star wheel and join the diametrically opposed slot) so that drive pin 48a cannot contact the bottom of the slot, but can only contacts the sides. The effects of this modification are that:

1. Drive pin 48a, being able to contact only the sides of slot 28a, operates on a maximized and relatively large effective pin moment arm, and therefore the pin loads required to apply torque to star wheel 23a are controlled.

2. The changes to the acceleration, velocity, and displacement profiles caused by this modification are very small, because the pin center path 401 to the left of the point of near-tangency 402 is very nearly a straight line anyway, as shown in FIGS. 6b and 6c.

3. There can be no loss of control of star wheel 23a when the acceleration changes from positive to negative, because drive pin 48a is in a close-fitting straight portion of curved slot 28a when the load is reversed, and there is negligible clearance.

It should be noted that, while the discussion thus far has referred to the input angle $\theta_i$ as an independent input variable, it is this angle which is used to adjust pin center path 401 so that the near-tangency to the x-axis of the star wheel is achieved. For the first embodiment of the present invention, the input half angle $\theta_i$ is 44.5°, and the incremental center distance is 0.049 inch.

An illustration of the first embodiment of the present invention appears in FIG. 6a. It is similar to Geneva Mechanism 10 shown in FIG. 1a, in that it possesses a driver 40a and a star member 20a. The driver has drive pin 48a on drive arm 46a, and a restraining cam 44a. The star member has concave surfaces 26a, which interact with restraining cam 44a, and curved slots 28a having concave portion 600, convex portion 625 and straight portion 650, which interact with drive pin 48a. As shown in FIG. 6a, this mechanism is just beginning an index. It can be seen that if the center of the pin follows the pin center profile shown in FIG. 6b as it enters star wheel 23a, and if it follows the mirror image of that profile as it exits, it will produce the open-mouthed slot with curved surfaces 28a, shown in FIG. 6a.

Clearly, however, curved slot 28a does not fit the drive pin 48a except at the deepest part. At its mouth, curved slot 28a is much wider than the diameter of drive pin 48a. Therefore, Geneva Mechanism 10a shown in FIG. 6a will operate without losing control of the driven load only if the operating speed is high enough to ensure that the torque necessary to accelerate and decelerate the rotating inertia is considerably higher than any drag torque. This will ensure that drive pin 48a will stay in contact with one wall of curved slot 28a while accelerating the load, and in contact with the other wall while decelerating the load. However, if star wheel 23a is subject to a sufficiently large externally applied reversing torque during the index, or if driver 40a reverses its direction of rotation partway through an index, contact between drive pin 48a and the appropriate slot wall could be lost. In a motion picture projector intermittent mechanism, however, none of these factors is present. The inertia torque is typically a number of times higher than the drag torque (which is the result of light film drag in the gate) because the projector runs at 24 frames per second. Furthermore, there is no source of externally applied reversing torque, and the driver direction of rotation never reverses. For an application which runs at slow speed, or is subject to externally applied reversing torque, or which reverses direction partway through an index, the present invention may not be applicable.

For the first embodiment of the present invention, as shown in FIG. 6a, the curves for displacement, velocity, and acceleration are shown in FIGS. 7a through 7c. The effective pin moment arm at which drive pin 48a acts on star wheel 23a to produce torque is plotted in FIG. 7d, and the pin load is plotted in FIG. 7e, for the Geneva Mechanism operating at 24 frames per second, in the same motion picture projector environment as is shown in FIGS. 4e and 2e, namely the inertia of the star member and sprocket (0.0003 oz-in-sec$^2$), and drag imparted to the film by the gate (5.5 oz). The time required for this mechanism with curved slots 28a to index is 98.9% of the time required for the conventional mechanism with straight slots 24 as shown in FIG. 1a to index, so there is very little improvement in time. However, the peak angular acceleration of 3.6 million deg./sec$^2$ is reached in a continuous and controlled manner and reduced to only 50.6% of the conventional peak acceleration of 7.0 million deg./sec$^2$, and the peak pin load of 5.8 pounds is reduced to only 54.7% of the conventional value of 10.6 pounds. Further, the peak deceleration is reached in a continuous and controlled manner. Thus, the improved Geneva Mechanism 10a of FIG. 6a could be employed as 1:1 replacement for the conventionally used mechanism, while significantly reducing the forces and wear experienced both by the mechanism itself and by the load (the film) as well.

Figure 7D:
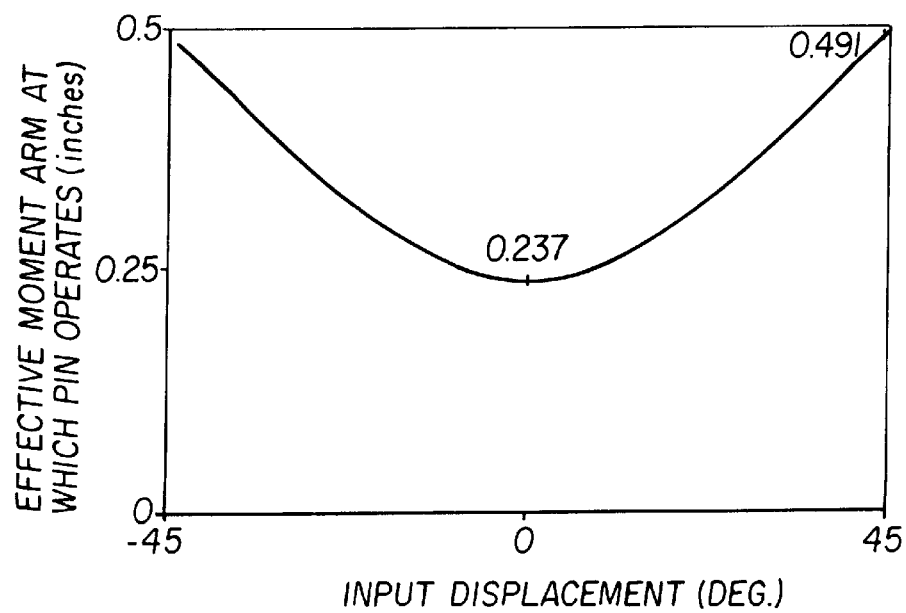
Figure 7E:
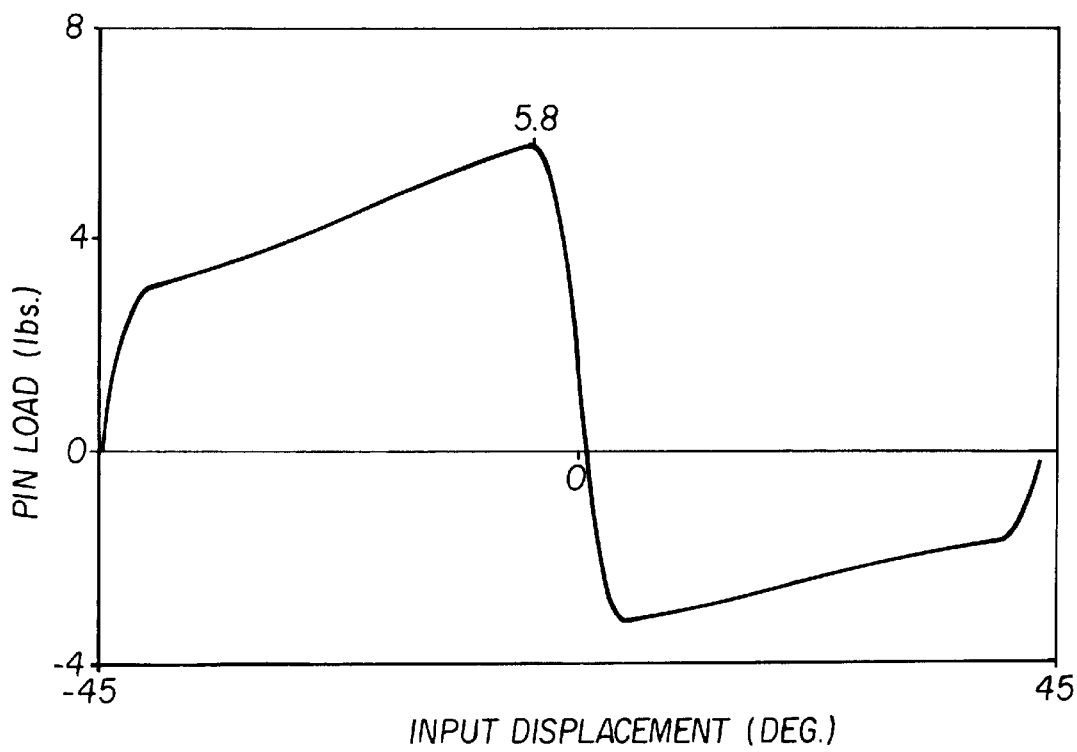

However, it still remains desirable to increase the effective speed of the indexing of a motion picture intermittent Geneva Mechanism, so as to increase the illuminated time per projected frame. The second embodiment of the present invention fulfills this need, by making further refinements to the acceleration profile, and thus to the shape of the curved slots of the star wheel. In particular, another input variable, namely a "slope fraction," is applied to the acceleration profile. In FIG. 7c the acceleration value for the first embodiment rises to a value which is held constant until nearly mid-index. And yet, because the effective pin moment arm decreases as mid-index is approached as shown in FIG. 7d, the pin load rises as mid-index is approached (as shown in FIG. 7e) because the load is proportional to the acceleration divided by the pin moment arm. The second embodiment of the present invention uses an acceleration curve which slopes downward as mid-index is approached, resulting in a nearly constant pin load curve. All the other features of the first embodiment are retained, such as the parabolic profiles on the first and last 10% of the acceleration profile, and the adjustment of the pin center curve to be tangent with the star wheel slot x-axis.

Figure 10A:
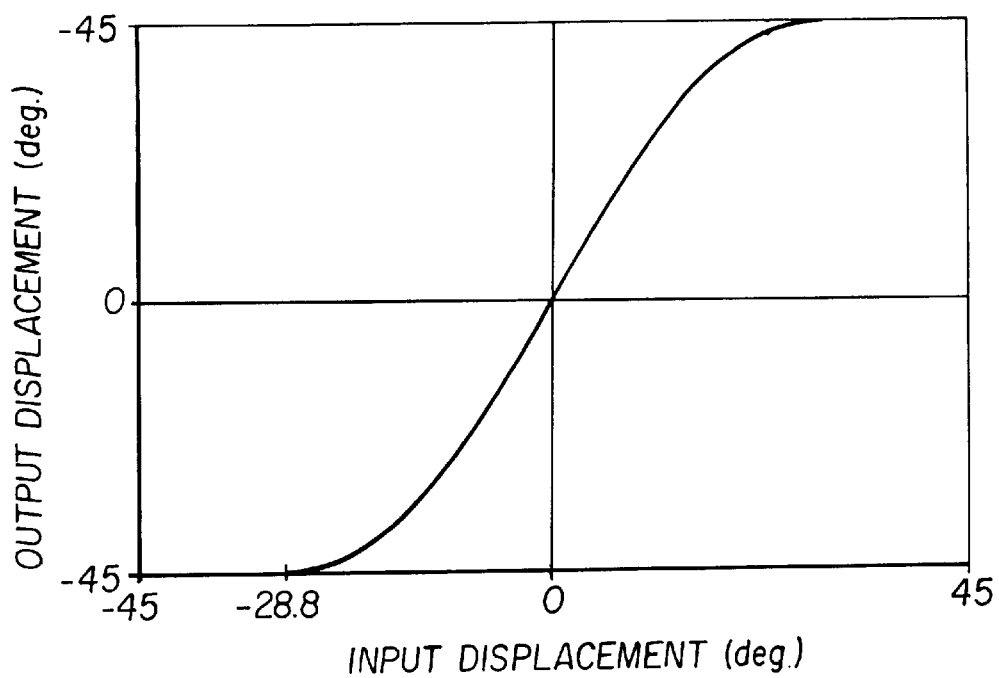
FIGS. 10a–10e are plots of the displacement, velocity, and acceleration of the star wheel, as well as the pin moment arm and the pin load on the star wheel driver, as experienced by the aforementioned components in a Geneva Mechanism according to the second embodiment of the present invention.
Figure 10B:
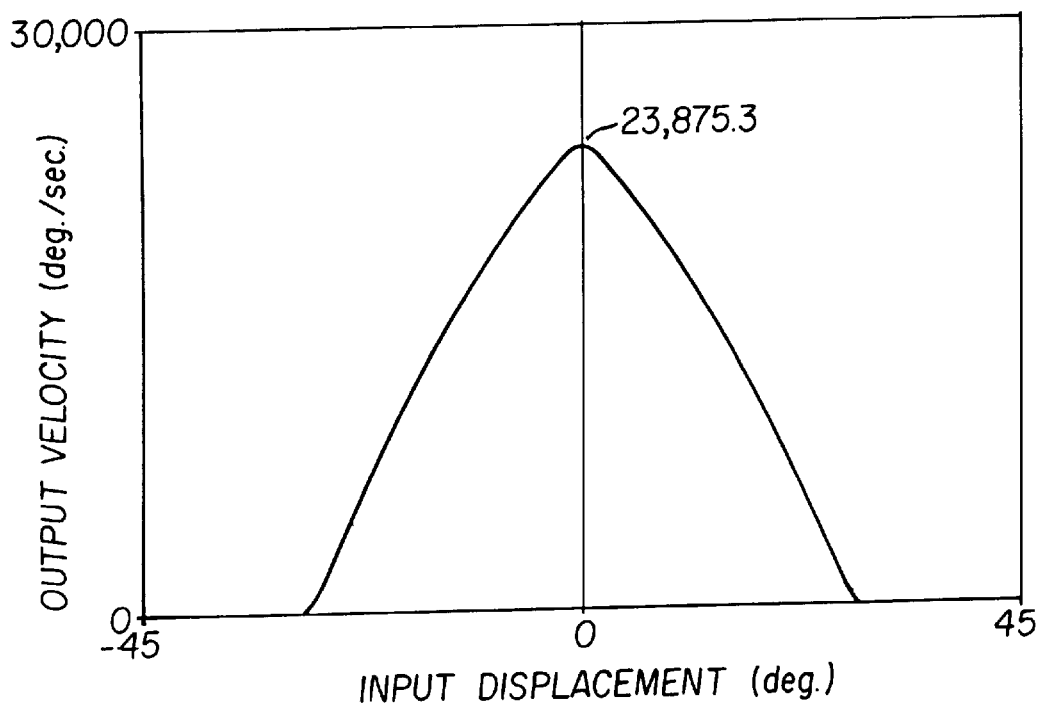
Figure 10C:
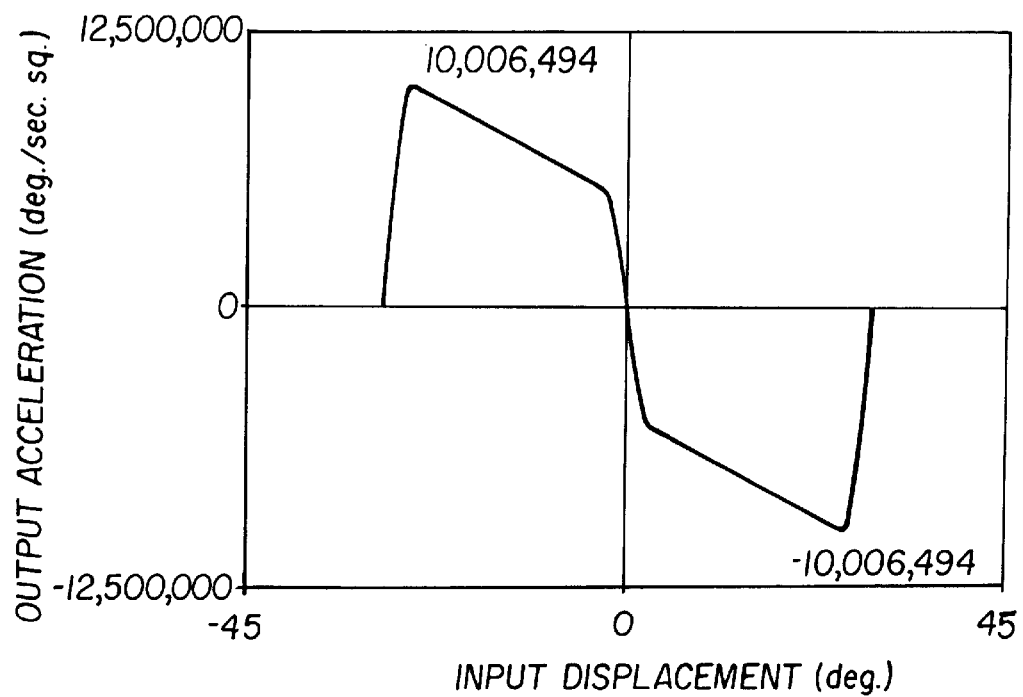
Figure 10D:
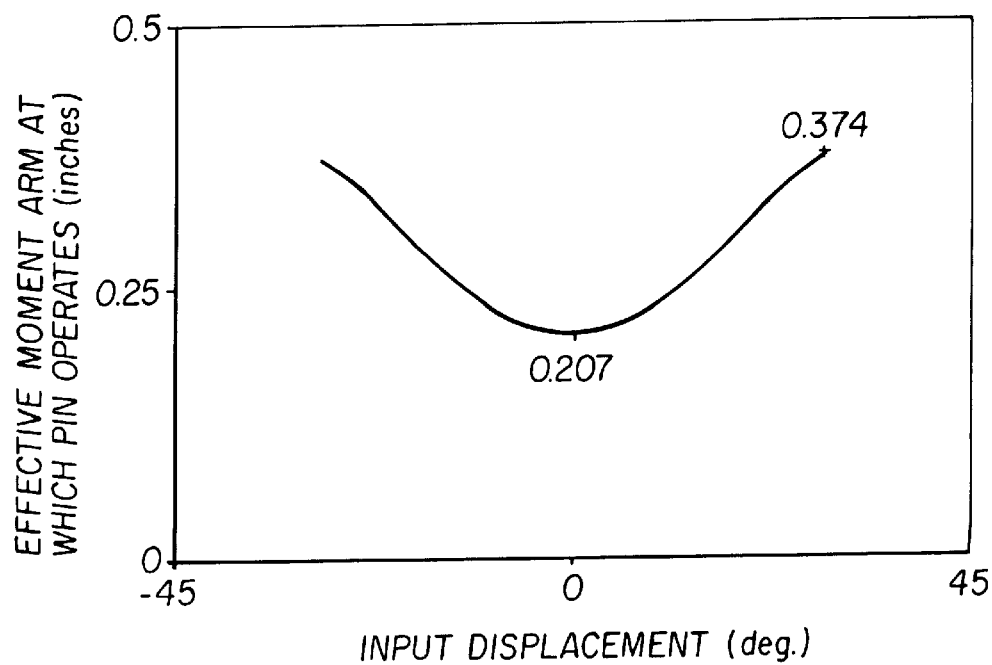
Figure 10E:
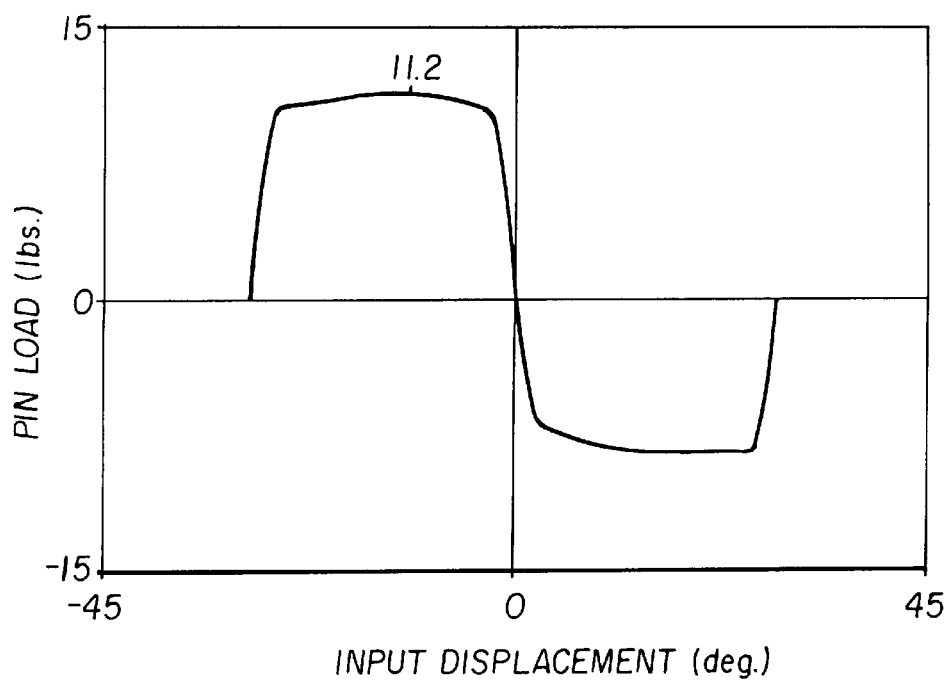
Figure 10F:
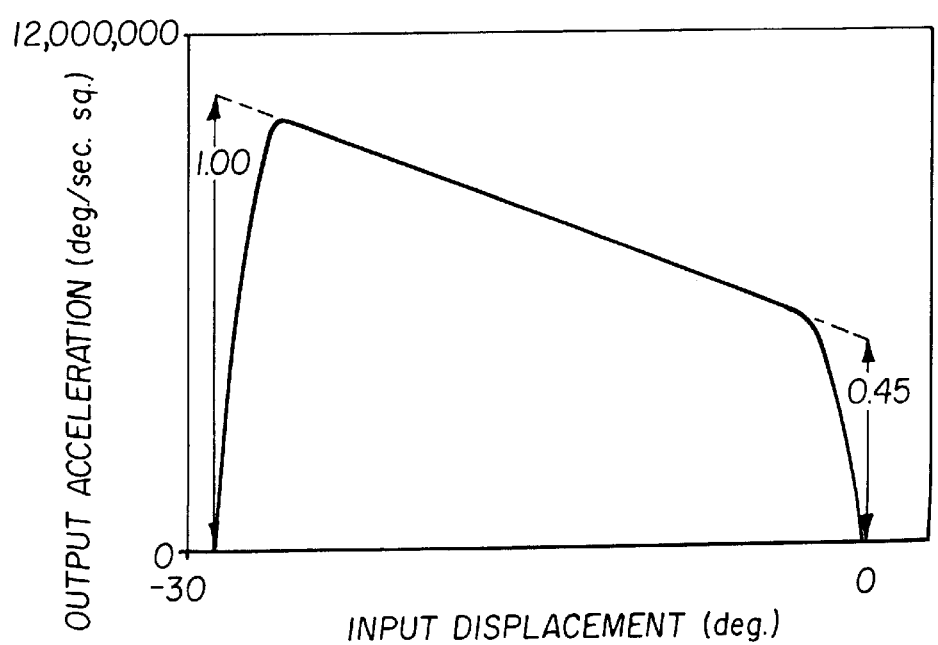
FIG. 10f is a graphic representation of how the slope fraction is applied to the acceleration profile.

In order to conveniently describe the acceleration profile with a slope, the concept of a "slope fraction" is introduced, as shown in FIG. 10f. The acceleration profile shown in FIG. 7c is multiplied by a downward-sloping straight line, the value of which is 1 at the beginning of the acceleration, and some smaller fraction at mid-index. In the case of the second embodiment, this slope fraction is 0.45 as shown in FIG. 10f.

Figure 9A:
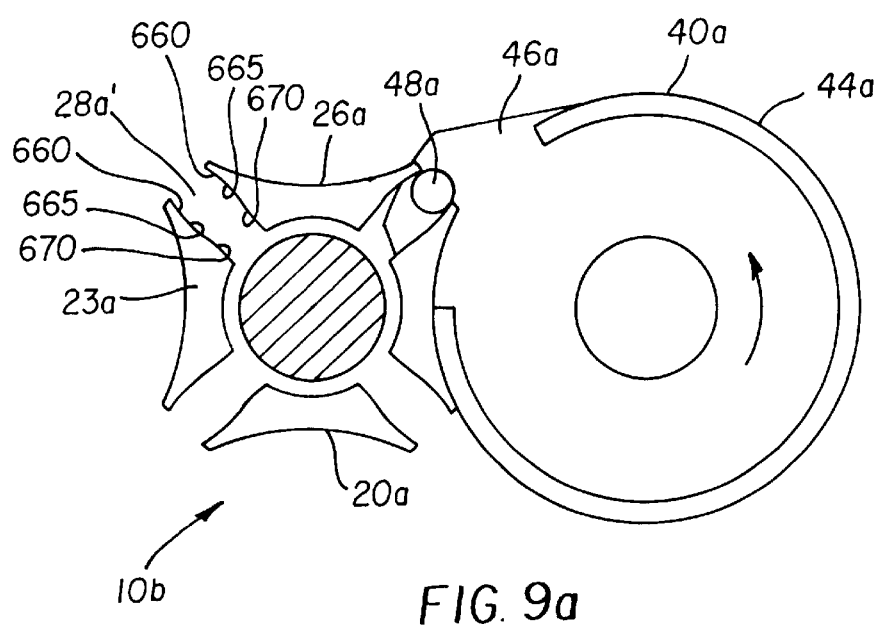
FIG. 9a is a top view of a Geneva Mechanism according to a second embodiment of the present invention.
Figure 9B:
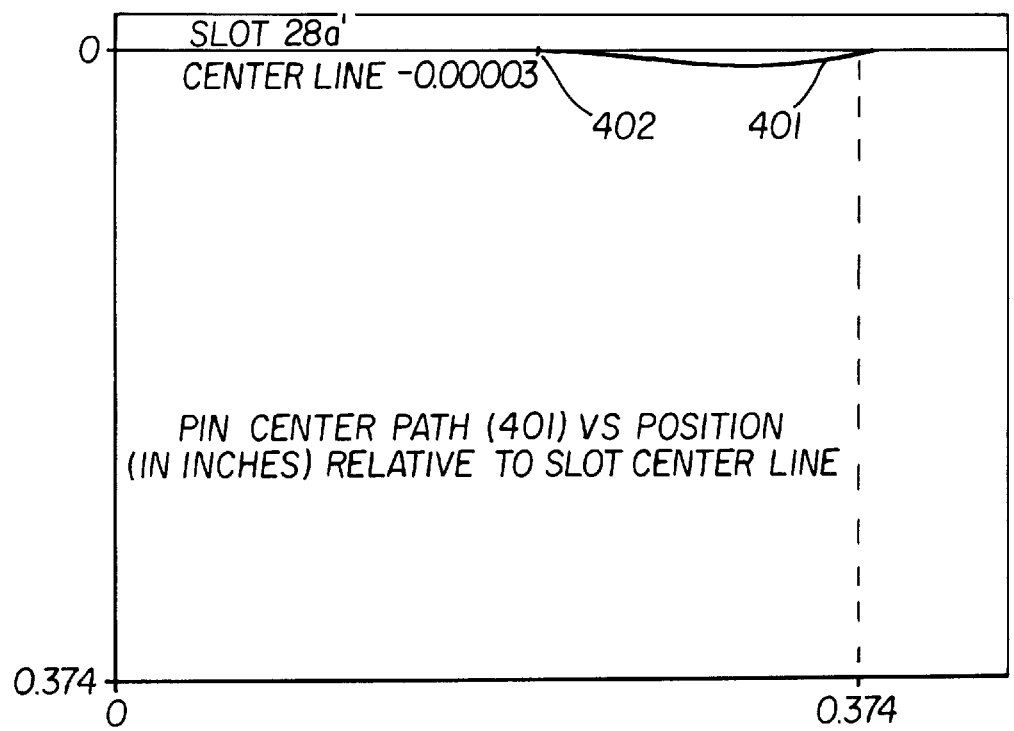
FIG. 9b is a plot of the pin center path in the star wheel member of the second embodiment of the present invention.
Figure 9C:
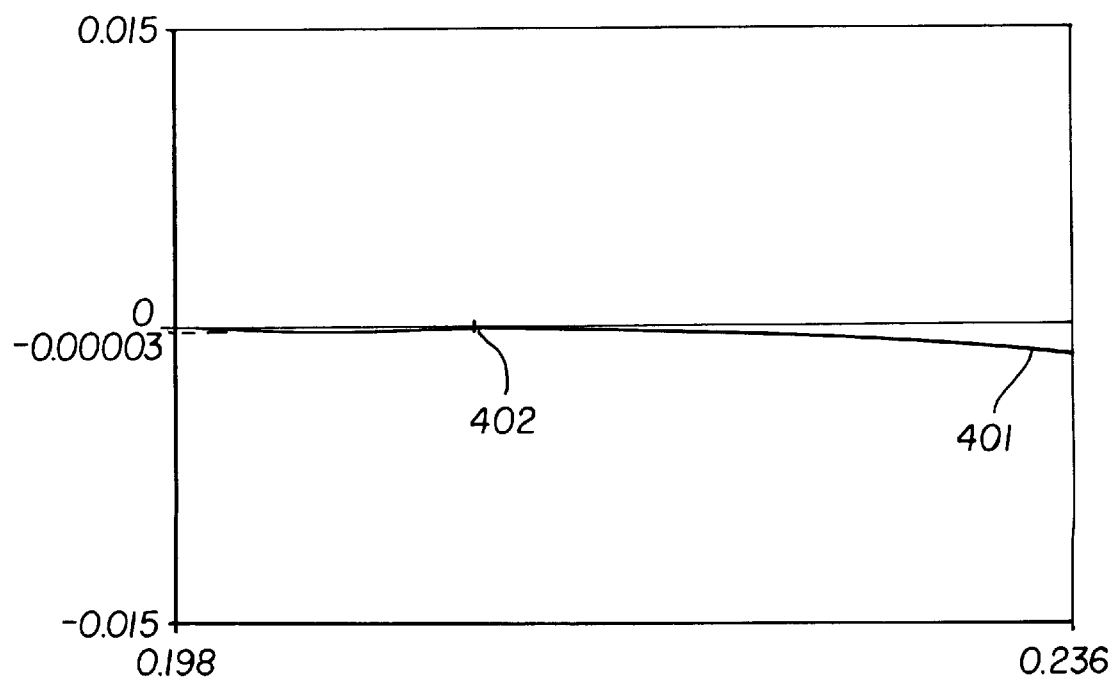
FIG. 9c is a magnified detail of the plot of FIG. 9b.

For the second embodiment of the present invention, a view of Geneva Mechanism 10b is shown in FIG. 9a. Geneva Mechanism 10b includes curved slots 28a' which each comprise a concave portion 660, a slightly convex portion 665 and a straight portion 670. FIG. 9b shows a plot of the pin center trace 401, and identifies the point of nearest approach 402 to the x-axis. As before, FIG. 9c gives a magnified detail of this approach.

The curves for displacement, velocity, and acceleration of the second embodiment are shown in FIGS. 10a through 10c. The acceleration profile in FIG. 10c reflects a slope fraction of 0.45. The effective pin moment arm at which drive pin 48a acts on star wheel 23a to produce torque is plotted in FIG. 10d, and the pin load is plotted in FIG. 10e, for the mechanism shown in FIG. 9a operating at 24 frames per second, in the same motion picture projector environment as is shown in FIGS. 2e, 4e, and 7e, namely the inertia of the star member and sprocket (0.0003 oz-in-sec$^2$), and drag imparted to the film by the gate (5.5 oz). The time required for this mechanism to index is only 64% of the time required for the conventional mechanism with straight slots as shown in FIG. 1a to index, so there is a substantial decrease in time required to index the film, and an opportunity to use shorter shutter times and improve screen illumination. However, the peak angular acceleration is 142% of the conventional acceleration, meaning the film perforations are more heavily loaded, and the peak pin load is slightly greater at 106% of the conventional value.

Figure 11:
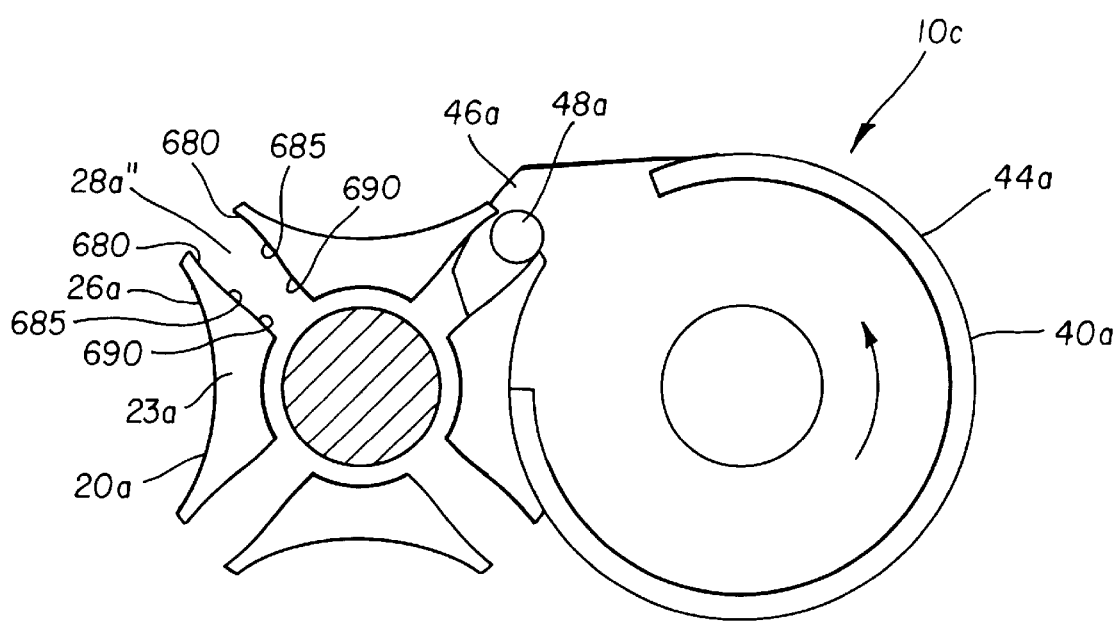
FIG. 11 is a top view of a Geneva Mechanism according to a third embodiment of the present invention.

The third embodiment of the present invention represents a middle ground between the first and second embodiments. It possesses a substantially decreased indexing time, comparable peak acceleration, and reduced pin load when compared with the straight slot mechanism in FIG. 1a. The slope fraction is 0.7 and the input half angle is 32.9°. The total center distance is 0.750 inch, of which 0.0082 inch is incremental center distance. FIG. 11 shows a view of Geneva Mechanism 10c, which is very similar in appearance to the second embodiment in FIG. 9a. Geneva Mechanism 10c includes slots 28a" each having a concave portion 680, a slightly convex portion 685 and a straight portion 690.

Figure 12A:
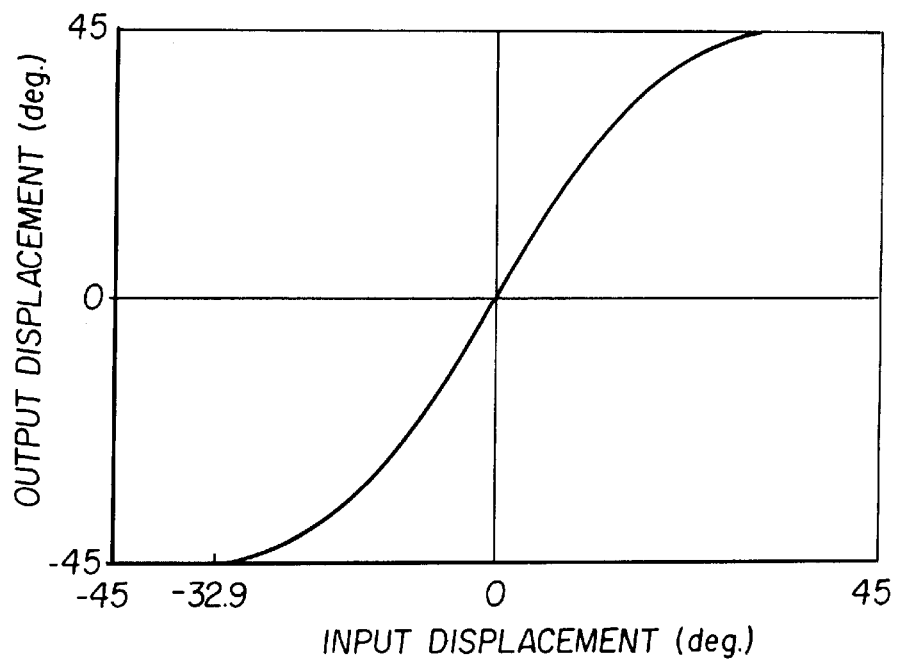
FIGS. 12a–12e are plots of the displacement, velocity, and acceleration of the star wheel, as well as the pin moment arm and the pin load on the star wheel driver, as experienced by the aforementioned components in a Geneva Mechanism according to the third embodiment of the present invention.
Figure 12B:
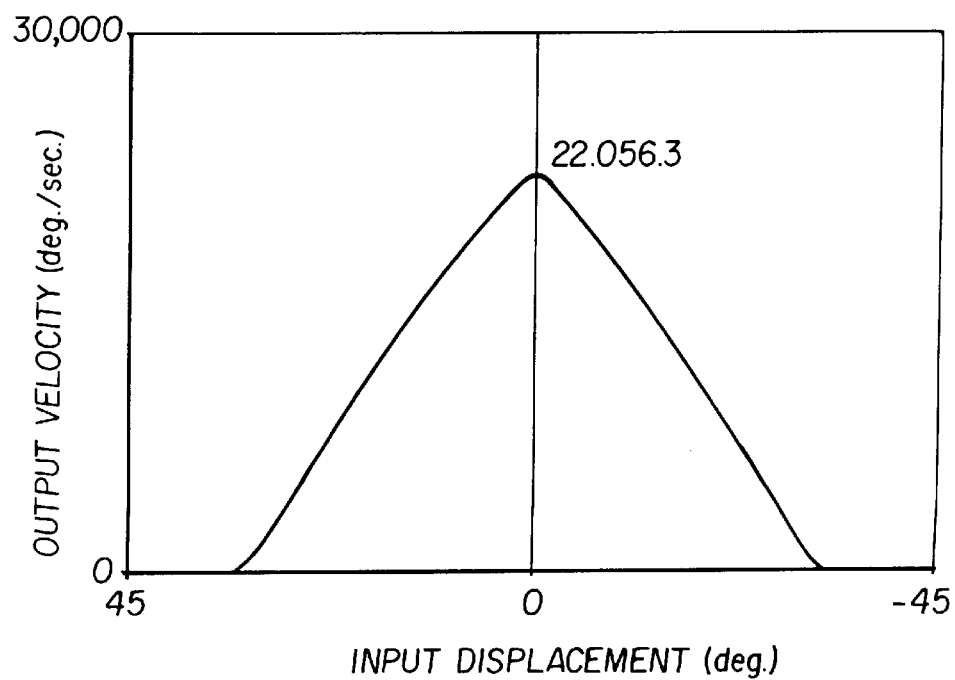
Figure 12C:
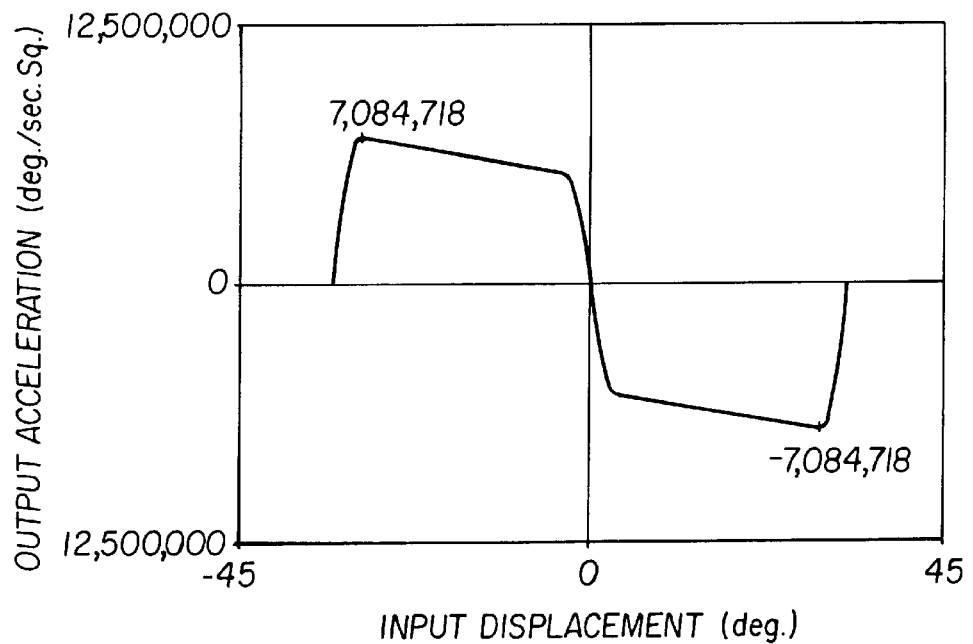
Figure 12D:
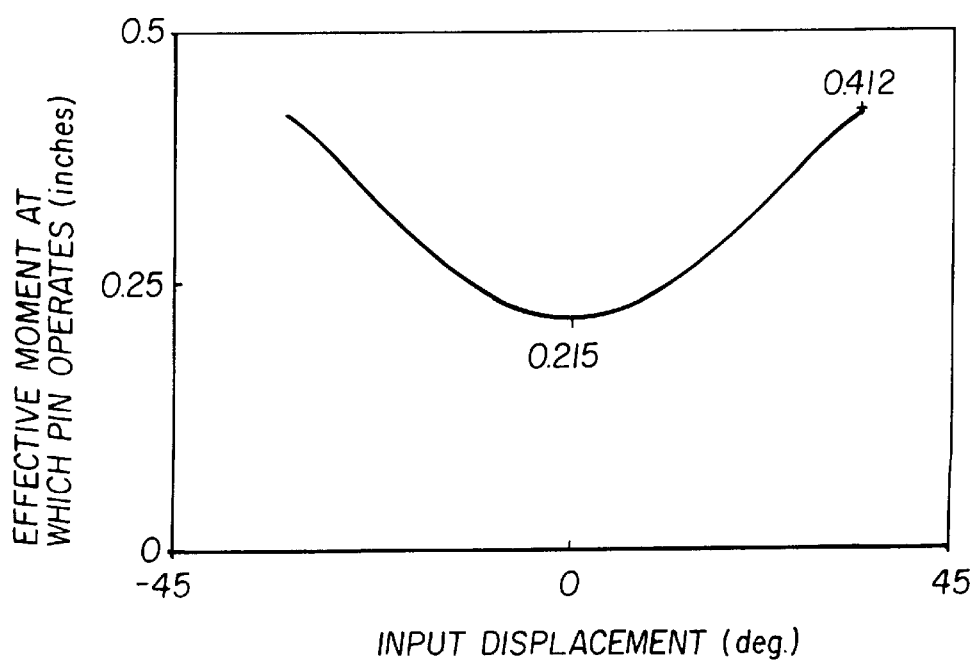
Figure 12E:
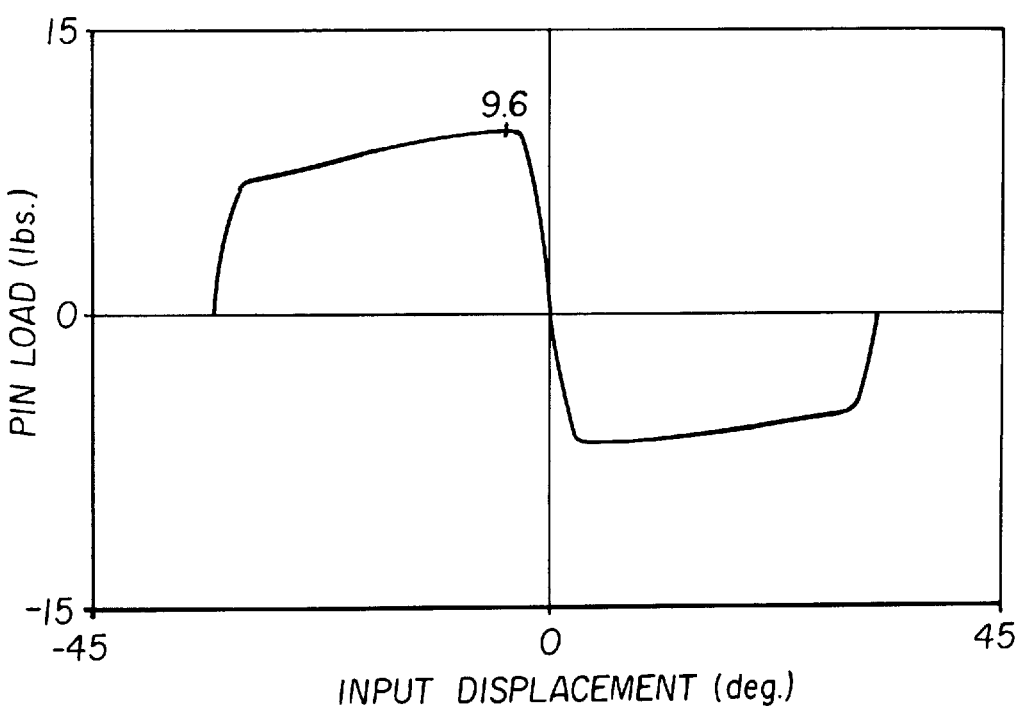

The curves for displacement, velocity, and acceleration of the third embodiment are shown in FIGS. 12a through 12c. The effective pin moment arm at which the pin acts on the star wheel to produce torque is plotted in FIG. 12d, and the pin load is plotted in FIG. 12e, for the mechanism shown in FIG. 11 operating at 24 frames per second, in the same motion picture projector environment as is shown in FIGS. 2e, 4e, 7e, and 10e, namely the inertia of the star member and sprocket (0.0003 oz-in-sec$^2$), and drag imparted to the film by the gate (5.5 oz). The time required for this mechanism to index is only 73% of the time required for the mechanism with straight slots as shown in FIG. 1a to index, so there is a substantial decrease in time required to index the film, and an opportunity to use shorter shutter times and improve screen illumination. The peak angular acceleration is 100.6% of the prior art acceleration, meaning the film perforation loading is essentially identical, and the peak pin load is decreased, at 91% of the conventional value.

Since the shutter is required to be closed for 27% less time than in the conventional projector, and since the shutter closed and open periods were essentially equal, this mechanism permits the length of time for which the screen is illuminated to be 127% of the previously available time.

To review, then, the truly independent input variables when designing a Geneva Mechanism in accordance with the first three embodiments of the present invention are as follows:

a) choice of modifying curve shape for the start of the acceleration profile;
b) fraction of acceleration time for which starting modifying curve is used;
c) choice of modifying curve shape for the midpoint of the acceleration profile;
d) fraction of acceleration time for which midpoint modifying curve is used;
e) shape of the linear portion of the acceleration curve, whether constant or descending, and to what degree ("slope fraction");
f) output half angle (usually 45° for motion picture projectors); and
g) incremental center distance.

The input variables which are not truly independent, and which are used to adjust the geometry of the mechanism so that the requirements of the present invention are achieved, are:

a) acceleration constant (by which all values of acceleration are multiplied, in order to achieve the desired output half angle of motion); and b) input half angle (used to adjust the pin center profile to achieve near-tangency with the star wheel x-axis).

A wide variety of mechanisms may be designed in accordance with the present invention to possess different peak accelerations and pin loads, by varying the values of the input variables. The three embodiments described above are a representative sample.

Figure 13A:
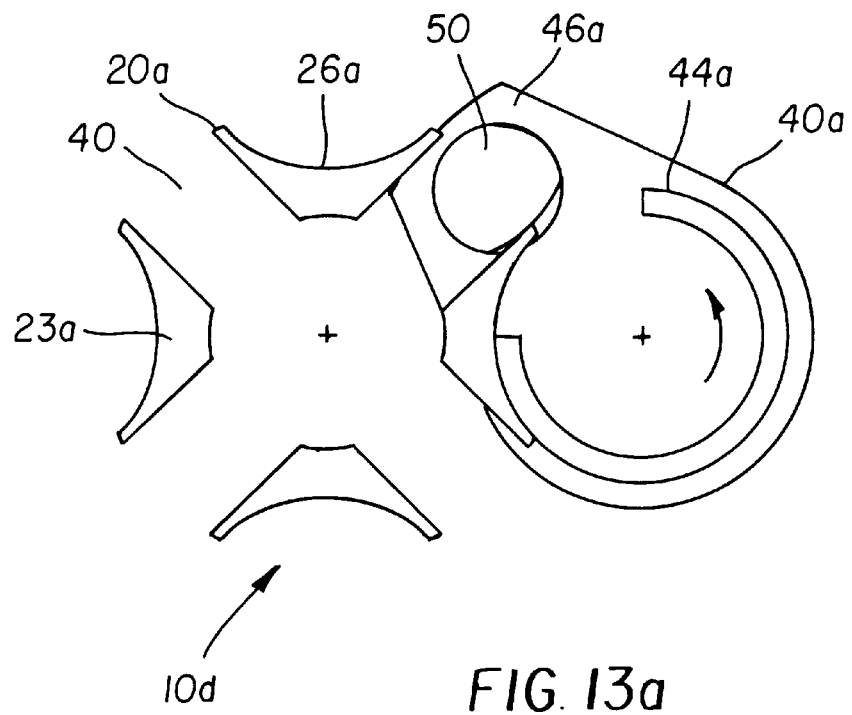
FIGS. 13a–13b are top views of a Geneva Mechanism according to a fourth embodiment of the present invention, shown at the start of index and at mid-index, respectively.
Figure 13B:
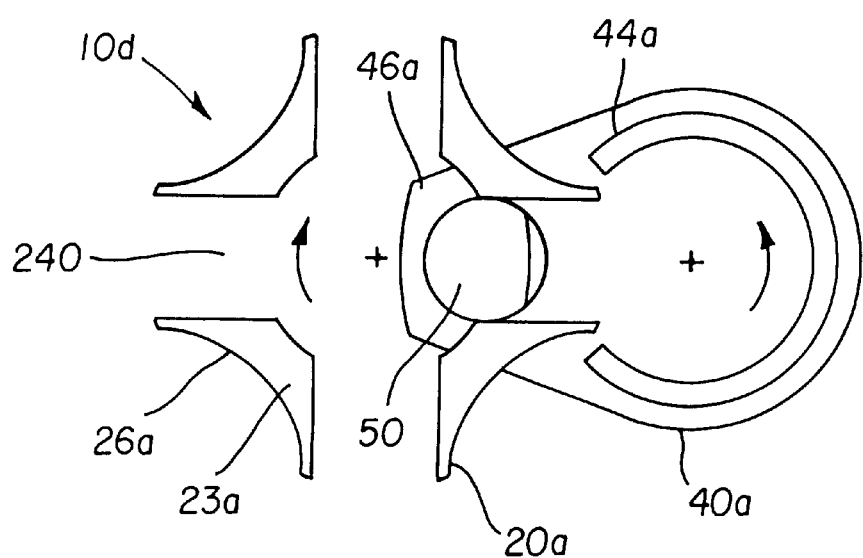

A fourth embodiment of the present invention for a Geneva Mechanism 10d is shown in FIGS. 13a and 13b. Unlike the first three embodiments, which control the acceleration of the star wheel 23a by providing specially curved slot walls 28a which are shaped in a controlled manner, this design uses parallel straight slot walls 240 in star wheel 23a, similar to FIG. 1a, but allows the acceleration of star wheel 23a to be controlled by driving it with a shaped drive pin 50 with a non-cylindrical profile. Thus, drive pin 50 is shaped in a controlled manner. The star wheel shaft 22a is present, but not shown in FIGS. 13a and 13b.

This embodiment does not offer the possibility of reducing the index time, because shaped drive pin 50 must always come into engagement with straight slot wall 240 in a tangent manner, and with straight and parallel slot walls there is only one input angle which can drive a four slot star wheel with tangent approach and recess, and that is 90° of input rotation, exactly like the mechanism in FIG. 1a. However, by incrementing the center distance and shaping the pin, the opportunity exists to control the acceleration profile and reduce the peak acceleration and the peak pin load to very nearly the same values as the first embodiment mechanism shown in FIG. 6a. FIG. 13a shows this embodiment at the beginning of index, and FIG. 13b shows it at mid-index. The mechanism looks different because the shaped drive pin 50 is large compared with the other embodiments. It is necessary to have a large pin in order to have enough material to create the profile. The shaped drive pin 50 shown in FIGS. 13a and 13b is nearly three times as large in diameter as the pins in the other embodiments.

Figure 14A:
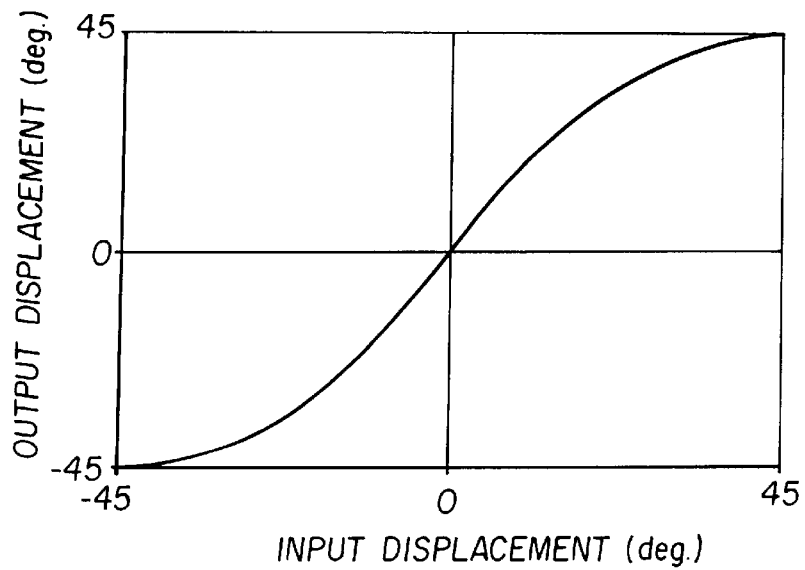
FIGS. 14a–14e are plots of the displacement, velocity, and acceleration of the star wheel, as well as the pin moment arm and the pin load on the star wheel driver, as experienced by the aforementioned components in a Geneva Mechanism according to the fourth embodiment of the present invention.
Figure 14B:
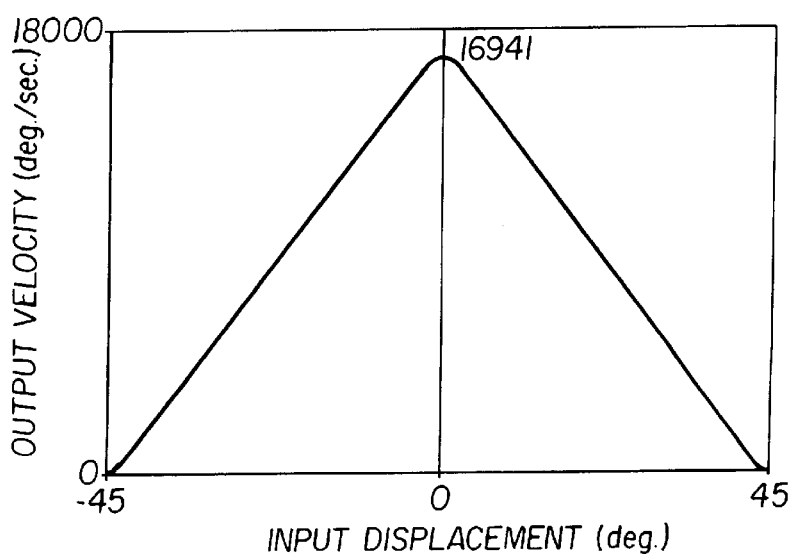
Figure 14C:
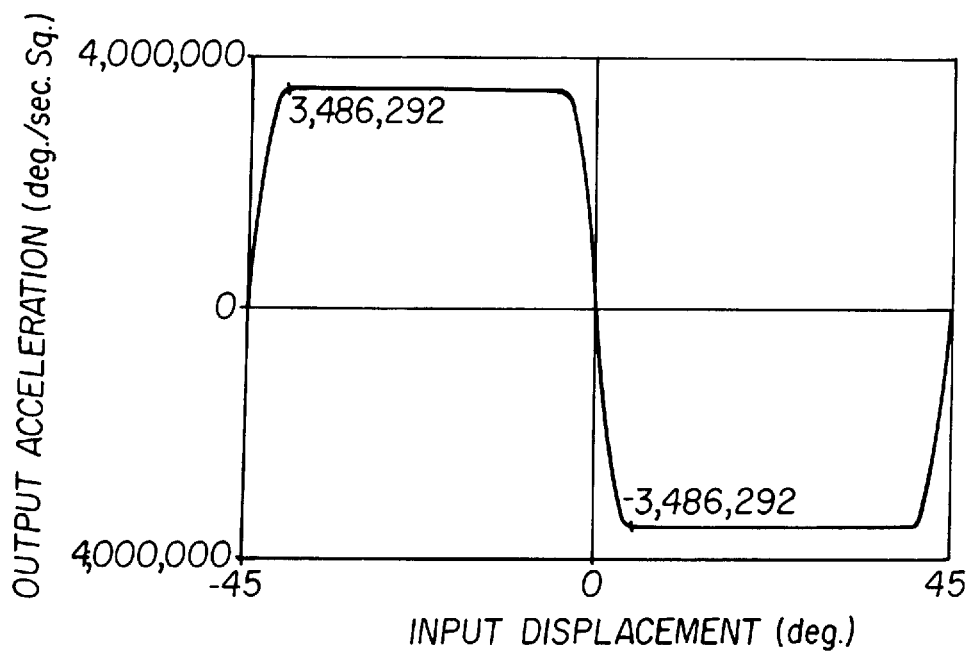
Figure 14D:
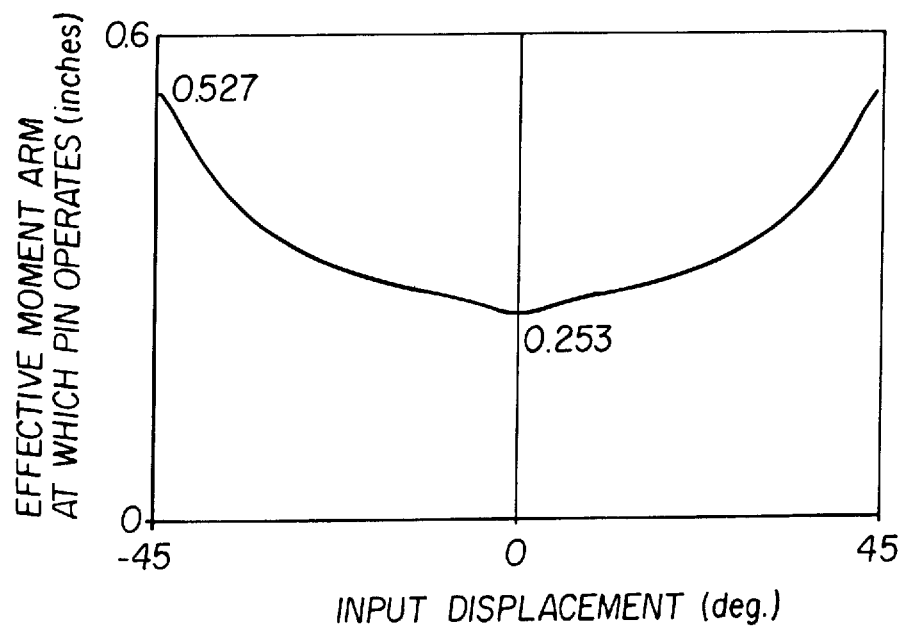
Figure 14E:
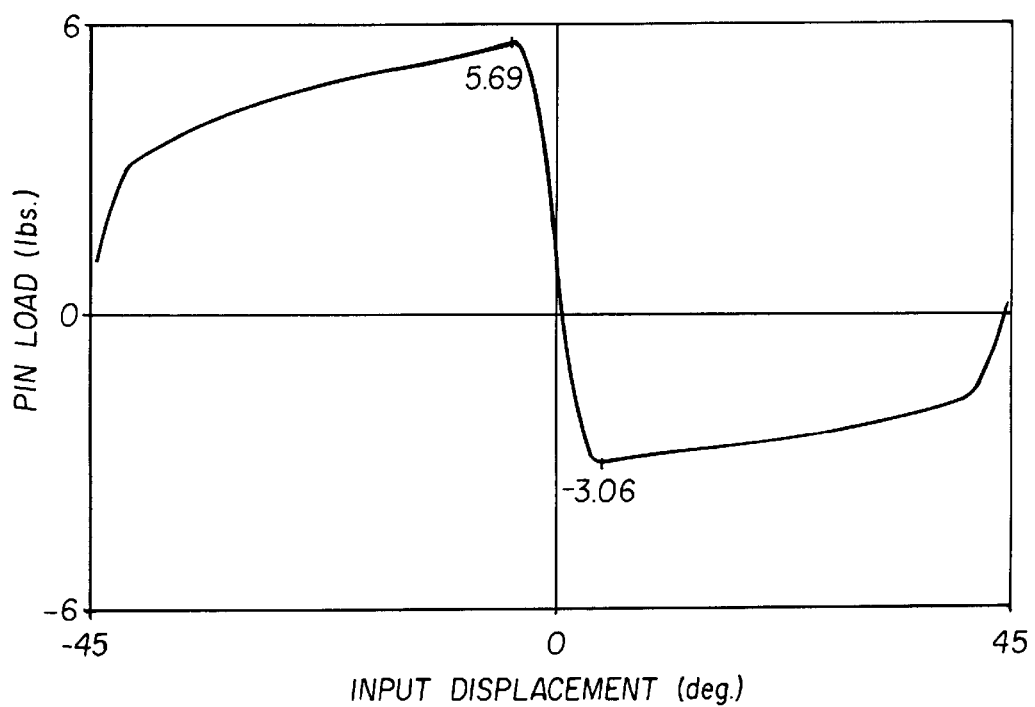

For the fourth embodiment of the present invention, the curves for displacement, velocity, and acceleration are shown in FIGS. 14a through 14c. The acceleration profile in FIG. 14c is essentially the same as presented in the first embodiment (FIG. 7c), with parabolic profiles on the first and last 10% of the half-curve. The effective pin moment arm at which the pin acts on the star wheel to produce torque is plotted in FIG. 14d, and the pin load is plotted in FIG. 14e, for the mechanism shown in FIG. 13a operating at 24 frames per second, in the same motion picture projector environment as is shown in the other pin load plots, FIGS. 2e, 4e, 7e, 10e, and 12e, namely the inertia of the star member and sprocket (0.0003 oz-in-sec$^2$), and drag imparted to the film by the gate (5.5 oz). The time required for this mechanism to index is exactly the same time required for the conventional Geneva Mechanism 10 with straight slots 24 as shown in FIG. 1a to index. However, the peak angular acceleration is only 49.5% of the conventional acceleration, and the peak pin load is only 53.7% of the conventional value.

While the fourth embodiment does not present the option of shortening the duration of the index, it is worthwhile to consider it, because in certain circumstances it may be preferable to manufacture a non-cylindrical shaped drive pin 50 (and keep the star wheel slots straight), rather than manufacturing a star wheel with curved slots (and keeping the drive pin cylindrical).

It should be understood that improved Geneva Mechanisms 10a–10d could be designed and used which employ both a non-cylindrical shaped drive pin 50 and curved slot walls 28. However, sufficient flexibility of design has been presented in the other embodiments that it is not clear why one would need to take on the manufacturing challenge of making both a non-cylindrical pin 50 and a star wheel 23a with curved slots 28a.

In practice, the mounting arrangement for driver 40a and star wheel members 20a in any of these embodiments would need to incorporate some means of adjusting the center distance between them. The means described in U.S. Pat. No. 1,774,789 would be suitable.

It should be understood that the embodiments of the present invention for improved Geneva Mechanisms 10a–10d, which are presented here represent points in a multi-dimensional continuum, and that all the input variables may be manipulated together or individually to create a wide variety of mechanisms which possess different properties.

While all the embodiments of the present invention which have been discussed possess four slots in the star member, it should be understood that the principle of devising a Geneva type mechanism which possesses a desired acceleration profile may also be applied to mechanisms with any number of star member slots greater than two.

While driver 40a of the disclosed inventive embodiments has been described as being driven with an essentially constant angular velocity, the present invention is not limited thereto. For example, driver 40a could be driven in a variable or non-constant manner by means such as a stepper motor, a servo motor or some other mechanism which provides a variable or non-constant drive.

Also, although the disclosed driver 40a has been described as including drive arm 46a with drive pin 48a mounted thereon, it is recognized that drive arm 46a is not an essential component of driver 40a. For example, all of the disclosed inventive embodiments could be configured such that driver 40a is in the form of a disk and drive pin 48a is positioned on the body of the disk such as shown in FIG. 3.

Manufacture of a star member 20a with curved slot walls 28a represents a greater challenge than manufacture of one with straight walls 24. However, a number of manufacturing methods exist in the art which may be applicable to producing these parts, among them being conventional electrical discharge machining (EDM), wire EDM, jig grinding, and high speed diamond or carbide milling. Manufacture of a non-cylindrical shaped drive pin 50 is also possible with existing methods.

FIG. 15 shows a perspective view of a motion picture projector employing the improved Geneva Mechanism of the present invention, with a driver 40a and star wheel 23a with slots 28a. The light emitted by a lamp or light source 102 (typically a xenon arc lamp) is directed by a reflector 104 through film gate 108 having a film gate aperture 108a and onto film 112. In such a system, light source 102 is imaged (or is conjugate to) film 112. A projection lens 110 then images film 112 onto a distant screen 500. Film frames of film 112 are intermittently moved past film gate 108 and aperture 108a by a sprocket 114, which shares a common shaft with star wheel 23a. A shutter 106, which is located just prior to film gate 108, is synchronized with the intermittent motion of Geneva Mechanisms 10a, 10b, 10c, 10d, such that it blocks incident light beam 116 during much of the time that film 112 is in motion.

The shutter blades of shutter 106 move across incident light beam 116 in a progressive fashion, darkening portions of an illuminated film frame, while other portions of the same frame remain fully illuminated. As noted before, the conventional Geneva Mechanism indexes during 25% of the frame time, following the acceleration profile of FIG. 2c.

When a two bladed shutter 106 is used, approximately 50% of the available light is then lost per frame time. However, as incident light beam 116 has a finite size, the time taken by shutter 106 to transit through the beam is significant, and represents a potential further reduction below 50% in the time in which the film frame is projected at full light level. It is common practice in the motion picture industry to enlarge the shutter openings, such that light is incident on film 112 during the initial and final portions of the indexing time, when the film displacement and velocity (see FIGS. 2a and 2b, respectively) is minimal. Thus, additional projectable time per frame is gained, at the cost of some motion of the film frame. The resulting image smear, or "travel ghost" which occurs when a moving image is projected, is kept below a threshold of perceptibility.

In the context of a motion picture projector 100, when an improved Geneva Mechanism 10a, 10b, 10c, 10d of the present invention is used, such as that of FIG. 11, the 27% improvement in indexing time may not be fully realized. Namely, the more aggressive acceleration profile (FIG. 12c) for this design, consequently allows less time to be gained for projection by projecting during the low velocity, low travel ghost periods of film motion. Shutter 106, can however be placed in a more advantageous position, relative to light source 102 and film 112, such that the reduced indexing time made possible by the improved Geneva Mechanism of the present invention, is more fully utilized.

Figure 16:
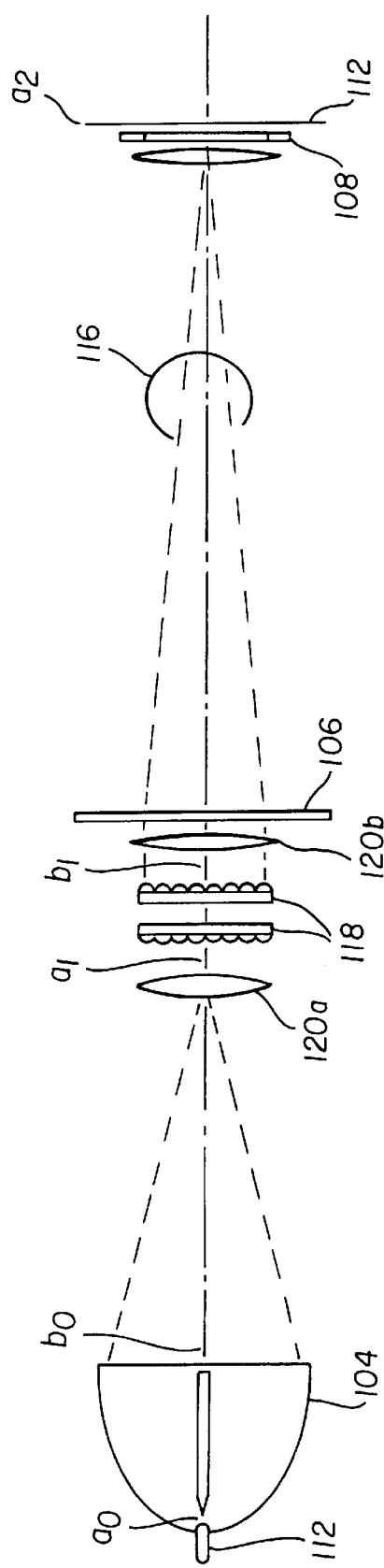
FIG. 16 is a side view of an optical illumination system employing a shutter in a location for improved performance.

FIG. 16 shows an alternate optical system for illuminating film 112, in which the light from light source 102 indirectly illuminates the film. Light from light source 102, which is emitted at plane $a_0$, is directed via a reflector 104, field lenses 120a and 120b, and uniformizer optics 118, to create a light beam 116 which is incident at film 112 located at film gate 108. Planes $a_0$, $a_1$, and $a_2$ are conjugate planes, such that the arc source at plane $a_0$ is re-imaged to plane $a_1$ and then to plane $a_2$. Film 112 is located at or near plane $a_2$. Plane $b_0$ corresponds to the lamp window/exit face, and it is conjugate to plane $b_1$. In the system of FIG. 15, shutter 106 is located in the vicinity of plane $b_1$, rather than near the film gate 108 and plane $a_2$, as would have been the case in the conventional motion picture projector. By locating shutter 106 at or near a plane, such as $b_1$, which is neither at nor near the film plane $a_2$ itself, nor at nor near another "a" plane which the film is conjugate to, the shutter becomes a "dimming" shutter. That is, rather than reducing light by appearing to sweep across the film frame in a progressive fashion, and leaving some frame portions fully lit, while other frame portions are dark, the "dimming" shutter causes the entire film frame to transition progressively from white to gray to black (or visa versa). This is because shutter 106 is progressively blocking light beam 116 in a fashion that reduces the angular spread of the light incident onto a frame, such that the entire frame is likewise affected. Shutter 106 is said to be located in a far field plane relative to the illuminated film 112. This is very helpful, relative to an improved Geneva Mechanism 10c, such as that of FIG. 11, as the perception of film motion or "travel ghost" will be diminished on a universally darkened image as compared to an image, which is still partially illuminated with light of full intensity. Such a "dimming" shutter has the additional advantage of reducing the visibility of flicker as the light level again is reduced in a more uniform manner.

It should be understood that the optical system of FIG. 16 is exemplary only. All that is required is that shutter 106 be located in a plane that is not the film plane, or conjugate to it, but in a plane at a distance from the film plane, where the shutter modulates the far field angular spectrum of the light beam which is incident to the film. Other optical configurations are possible, for example, where the lamp window, rather than the arc source, is imaged to the film plane, without affecting the benefits gained by locating the shutter 106 at a plane other than the film plane, or one conjugate to it. Uniformizing optics 118 are not necessary; for example, a classical Koehler illumination could be used with the shutter again appropriately located. The actual location of shutter 106 is not exacting. It must be located near the non-conjugate plane $b_1$ (and it could be to either side of field lens 120b), as long as it obstructs the light beam 116 substantially in angular space relative to film 112. While shutter 106 is shown as a common two-bladed mechanical shutter, it should be understood that shutter 106 could also be a three-bladed shutter, a shutter with micro-mechanical elements such as louvers, or an electro-optical shutter.

The invention has been described in detail with particular reference to certain preferred embodiments thereof, but it will be understood that variations and modifications can be effected within the spirit and scope of the invention.

What is claimed is:

1. A Geneva Mechanism for intermittently driving a load, the mechanism comprising:

a rotating driver having a drive pin;

a star wheel operationally associated with a load which is to be intermittently driven, said star wheel comprising a plurality of radially extending slots, each of said radially extending slots being curved along a substantial portion of its length;

said drive pin of said rotating driver being engageable with one of said radial extending slots to drive said star wheel in an incremental angular manner, such that a drive pin load on said drive pin and forces applied to the load operationally associated with said star wheel remain in control, and said star wheel reaches a peak acceleration and deceleration in a continuous and controlled manner;

wherein each of said radially extending slots define a firstwall having a concave portion adjacent a mouth of said slot, a slightly convex portion along a middle portion of said slot, and a straight portion at an inner portion of said slot; and a second wall having a concave portion adjacent said mouth of said slot, a slightly convex portion along said middle portion of said slot, and a straight portion at said inner portion of said slot.

2. A mechanism according to claim 1, wherein each of said radially extending slots comprise walls which are wider than said drive pin at an opening of said slots and gradually approach each other and become straight parallel surfaces at an innermost portion of said slot, said walls being separated by a nominal pin width of said drive pin at the innermost portion of said slot.

3. A mechanism according to claim 1, wherein at least three of said radially extending slots are periodically positioned around said star wheel.

4. A mechanism according to claim 1, wherein said rotating driver further comprises a restraining cam having a cylindrical convex surface, and said star wheel comprises a concave cam follower guiding surface interposed between each pair of said radially extending slots, wherein during a time when the drive pin is not engaged with one of said radially extending slots, said cylindrical convex surface is engaged with said concave cam follower guiding surface.

5. A mechanism according to claim 1, wherein said load to be intermittently driven is motion picture film which is to be driven past a projection aperture of a projection system.

6. A mechanism according to claim 1 wherein said drive pin has a controlled shaped surface and is engageable with one of said radially extending slots to drive said star wheel in an incremental angular manner while minimizing load forces on the drive pin, the star wheel and the load to be intermittently driven.

7. A drive mechanism for driving a load, the mechanism comprising:

a first rotary member which provides an essentially uniform rotary motion, said first rotary member comprising a drive pin;

a secondary rotary member operationally associated with a load which is to be driven, said second rotary member comprising a plurality of radially extending slots which are curved along a substantial portion of a length of slots, each of said slots being engageable with said drive pin of said first rotary member during a rotation of said first rotary member, to provide an incremental angular rotation to said second rotary member while a drive pin load on said drive pin and forces applied to the load which is to be intermittently driven remain in control;

wherein each of said radially extending slots define a first wall having a concave portion adjacent a mouth of said slot, a slightly convex portion along a middle portion of said slot, and a straight portion at an inner portion of said slot; and a second wall having a concave portion adjacent said mouth of said slot, a slightly convex portion along said middle portion of said slot, and a straight portion at said inner portion of said slot.

8. A mechanism according to claim 7, wherein each of said slots comprising opposing walls which are wider than said drive pin at an opening of said slot and gradually approach each other and become straight parallel surfaces at an innermost end of said slot, said opposing walls being separated by a nominal width of said drive pin at the innermost end of said slot.

9. A mechanism according to claim 7, wherein the load which is to be driven is a film of a motion picture projector.

10. A projection system for motion picture film, the projection system comprising:

a film gate having a projection aperture, such that film frames of said film move past said projection aperture;

a light source;

illumination optics for directing light from said light source into said projection aperture of said film gate;

a projection lens for projecting an image of each of said film frames onto a screen;

a Geneva Mechanism for moving the film progressively past the projection aperture, said Geneva Mechanism comprising a rotating driver having a driver arm and a drive pin mounted on one end of the driver arm, and a star wheel operationally associated with said film, said star wheel comprising a plurality of radially extending slots which cooperate with the drive pin of said rotating driver to cause an intermittent rotation of said star wheel upon a rotation of said rotating driver, and thereby cause an intermittent motion of said film;

a shutter mechanism which blocks light incident onto the film frames of said film in synchronization with the intermittent motion of said film; and wherein each of said radially extending slots define a firstwall having a concave portion adjacent a mouth of said slot, a slightly convex portion along a middle portion of said slot, and a straight portion at an inner portion of said slot;

a second wall having a concave portion adjacent said mouth of said slot, a slightly convex portion along said middle portion of said slot, and a straight portion at said inner portion of said slot; and one of said drive pin or said radially extending slots being shaped in a controlled manner to permit said star wheel to reach a peak acceleration and deceleration in a continuous manner.

11. A projection system according to claim 10, wherein said shutter mechanism is located in a plane within the illumination optics which is different than a plane in which said film resides.

12. A projection system according to claim 10, wherein said shutter mechanism is located at a plane where the shutter mechanism modifies an angular far field spectrum of light which is incident on the film.

13. A projection system according to claim 10, wherein each of said radially extending slots are curved along a substantial portion of its length.

14. A projection system according to claim 10, wherein said drive pin is a shaped pin which has a non-cylindrical profile.

15. A projection system according to claim 10, wherein each of said radially extending slots comprises opposing walls which are wider than said drive pin at an opening of said slot and gradually approach each other and become straight parallel surfaces at an innermost end of said slot, said opposing walls being separated by a nominal width of said drive pin at said innermost end of said slot.

16. A projection system for film, the projection system comprising:

a film gate having a projection aperture, such that film frames of the film move past said projection aperture; and a drive mechanism for moving the film progressively past the projection aperture, the drive mechanism comprising a first rotary member having a drive pin and a second rotary member operationally associated with film, said second rotary member comprising a plurality of slots which cooperate with said drive pin of said first rotary member to cause an intermittent rotation of said second rotary member and thereby cause an intermittent motion of said film, one of said drive pin or said slots being shaped in a controlled manner to permit said second rotary member to reach a peak acceleration and a peak deceleration in a continuous manner.

17. A projection system according to claim 16, wherein each of said slots comprise a concave portion, a slightly convex portion and a straight portion;

wherein each of said radially extending slots define a firstwall having a concave portion adjacent a mouth of said slot, a slightly convex portion along a middle portion of said slot, and a straight portion at an inner portion of said slot; and a second wall having a concave portion adjacent said mouth of said slot, a slightly convex portion along said middle portion of said slot, and a straight portion at said inner portion of said slot.

18. A projection system according to claim 16, wherein each of said slots is curved along a substantial portion of its length.

19. A projection system according to claim 16, wherein each of said slots comprises opposing walls which are wider than said drive pin at an opening of said slot and gradually approach each other and become straight parallel surfaces at an innermost end of said slot, said opposing walls being separated by a nominal width of said drive pin at said innermost end of said slot.

20. A projection system according to claim 16, wherein said drive pin is a shaped pin which has a non-cylindrical profile.

21. A Geneva Mechanism for intermittently driving a load, the mechanism comprising:

a rotating driver having a drive pin;

a star wheel operationally associated with a load which is to be intermittently driven, said star wheel comprising a plurality of radially extending slots, each of said radially extending slots being curved along a substantial portion of its length;

said drive pin of said rotating driver being engageable with one of said radial extending slots to drive said star wheel in an incremental angular manner, such that a drive pin load on said drive pin and forces applied to the load operationally associated with said star wheel remain in control, and said star wheel reaches a peak acceleration and deceleration in a continuous and controlled manner; and wherein each of said radially extending slots comprise walls which are wider than said drive pin at an opening of each of said slots and gradually approach each other and become straight parallel surfaces at an innermost portion of said slot, said walls being separated by a nominal pin width of said drive pin at the innermost portion of said slot.

22. A Geneva Mechanism for intermittently driving a load, the mechanism comprising:

a rotating driver having a drive pin;

a star wheel operationally associated with a load which is to be intermittently driven, said star wheel comprising a plurality of N radially extending slots, each of said radially extending slots being curved along a substantial portion of its length;

said drive pin of said rotating driver being engageable with one of said radial extending slots to drive said star wheel in an incremental angular manner, such that a drive pin load on said drive pin and forces applied to the load operationally associated with said star wheel remain in control, and said star wheel reaches a peak acceleration and deceleration in a continuous and controlled manner such that rotation of the drive pin causes the star wheel to index through its motion; and both the peak acceleration and the indexing time are optimized as compared to the peak acceleration and indexing time of a conventional star wheel with a like number of radially extending straight walled slots.

* * * * *